United States Patent
Lai et al.

(10) Patent No.: US 7,940,844 B2
(45) Date of Patent: May 10, 2011

(54) VIDEO ENCODING AND DECODING TECHNIQUES

(75) Inventors: King-Chung Lai, San Diego, CA (US); Gilbert Christopher Sih, San Diego, CA (US); Chienchung Chang, Rancho Sante Fe, CA (US); Anthony Patrick Mauro, II, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1125 days.

(21) Appl. No.: 10/371,793

(22) Filed: Feb. 21, 2003

(65) Prior Publication Data

US 2004/0008780 A1    Jan. 15, 2004

Related U.S. Application Data

(60) Provisional application No. 60/390,101, filed on Jun. 18, 2002.

(51) Int. Cl.
*H04N 7/12* (2006.01)
(52) U.S. Cl. ............................... 375/240.16; 375/240.24
(58) Field of Classification Search ............. 375/240.16, 375/240.17, 240.21, 240.24, 240.14
See application file for complete search history.

(56) References Cited

U.S. PATENT DOCUMENTS

| | | | | |
|---|---|---|---|---|
| 5,576,767 A | * | 11/1996 | Lee et al. ................. | 375/240.14 |
| 5,864,372 A | * | 1/1999 | Chen et al. .................... | 348/699 |
| 5,987,178 A | * | 11/1999 | Anesko et al. ................ | 382/236 |
| 6,031,582 A | | 2/2000 | Nishikawa et al. | |
| 6,043,846 A | | 3/2000 | Shen et al. | |
| 6,081,554 A | | 6/2000 | Lee et al. | |
| 6,122,442 A | | 9/2000 | Purcell et al. | |
| 6,125,149 A | | 9/2000 | Jafarkhani et al. | |
| 6,154,492 A | | 11/2000 | Araki et al. | |
| 6,233,226 B1 | | 5/2001 | Gringeri et al. | |
| 6,363,117 B1 | * | 3/2002 | Kok ......................... | 375/240.24 |
| 6,393,154 B1 | | 5/2002 | Lafe | |
| 6,687,299 B2 | | 2/2004 | Yoshida et al. | |
| 6,690,727 B1 | * | 2/2004 | Mehta ....................... | 375/240.12 |
| 6,744,738 B1 | | 6/2004 | Park et al. | |

(Continued)

FOREIGN PATENT DOCUMENTS

CN          1347619          5/2002

(Continued)

OTHER PUBLICATIONS

Hang, et al., *Motion Estimation for Video Coding Standards, Journal of VLSI Signal Processing*, 17. 113-136 (1997).

(Continued)

*Primary Examiner* — Gims S Philippe

(57) ABSTRACT

This disclosure describes video encoding techniques capable of reducing the number of processing cycles and memory transfers necessary to encode a video sequence. In this manner, the disclosed video encoding techniques may increase video encoding speed and reduce power consumption. In general, the video encoding techniques make use of a candidate memory that stores video blocks in columns corresponding to a search space for a motion estimation routine. A memory control unit addresses the candidate memory to retrieve multiple pixels in parallel for simultaneous comparison to pixels in a video block to be encoded, e.g., using Sum of Absolute Difference (SAD) or Sum of Squared Difference (SSD) techniques. A difference processor performs the parallel calculations. In addition, for subsequent video blocks to be encoded, the candidate memory can be incrementally updated by loading a new column of video blocks, rather than reloading the entire search space.

26 Claims, 16 Drawing Sheets

U.S. PATENT DOCUMENTS

| | | | |
|---|---|---|---|
| 6,941,265 | B2 | 9/2005 | Bi |
| 7,039,246 | B2 * | 5/2006 | Mauro et al. .................. 382/236 |
| 7,051,356 | B2 * | 5/2006 | Weinstein ..................... 725/105 |
| 7,359,559 | B2 | 4/2008 | Mauro, II et al. |
| 2004/0008779 | A1 | 1/2004 | Lai et al. |
| 2006/0114264 | A1 | 6/2006 | Weybrew et al. |

FOREIGN PATENT DOCUMENTS

| | | |
|---|---|---|
| EP | 1294194 | 3/2003 |
| EP | 1313323 | 5/2003 |
| JP | 0106674 | 4/2000 |
| JP | 2000350216 | 12/2000 |
| JP | 2001218215 | 8/2001 |
| KR | 1020010071692 | 7/2001 |
| TW | 512309 | 12/2002 |
| TW | 546630 | 8/2003 |
| WO | 9952297 | 10/1999 |
| WO | 9953478 | 10/1999 |
| WO | 0067487 | 11/2000 |
| WO | 0172045 | 9/2001 |
| WO | 0195312 | 12/2001 |

OTHER PUBLICATIONS

Yosino et al., *A 54MHz Estimation Engine for Real Time MPEG Video Encoding*, ICEE 21-23:76-77 (1994).

Kuhn, et al., *A flexible VLSI architecture for variable block size segment matching with luminance corrrection* USA, IEE, Comput. Soc, US., 479-488 (1997).

Jaehun Lee, et al., *A new VLSI Architecture of a hierarchiacal motion estimator for low bit rate video coding* ICEE 774-778 (1999).

T. Wiegand., *Working Draft Number 2, Revision 0*, JVT-B118R1: pp. 1-99.

Lethtorant, et al., *Real-time H.263 encoding of QCIF- imagaes on TMS320C6201 fixed point DSP*, vol. 1:28-31 (2000).

ISR/PCT/US03/019397 DOM Jan. 27, 2004.

Kuhn P.M. "Fast MPEG-4 Motion Estimation: Processor Based and Flexible VLSI Implementation," Journal of VLSI Signal Processing Systems for Signal, Image, and Video Technology, Kluwer Academic Publishers, Dordrecht, NL, vol. 23, No. 1, Oct. 1999, pp. 67-92.

Yeu-Shen Jehng et al: "An Efficient and Simple VLSI Tree Architect for Motion Estimation Algorithms," IEEE Transactions On Signal Processing, IEEE, Inc. NewYork, US, vol. 41, No. 2, Feb. 1, 1993, pp. 889-900.

Jung, S-M, et al., "Efficient Multilevel Successive Eiimination Algorithms for Block Matching Motion Estimation," IEEE Proceedings: Vision, Image and Signal Processing, Apr. 22, 2002, pp. 73-84.

Lengwehasatit, K., et al., "Computationally Scalable Partial Distance Based Fast Search Motion Estimation,"Proceedings of 7th Ieee International Conference on Image Processing, Sep. 10-13, 2000, pp. 824-827.

Lengwehasatit, K., et al., "Probabilistic Partial—Distance Fast Matching Algorithms for Motion Estimation," IEEE Transactions on Circuits and Systems for Video Technology, New York, US, Feb. 2001, pp. 139-152.

International Preliminary Examination Report—PCT/US03/019401—IPEA/US—Mar. 25, 2007.

International Preliminary Examination Report—PCT/US03/019401—International Search Authority—European Patent Office—May 24, 2004.

European Search Report & Search Opinion—EP06009154, Search Authority—Berlin, Sep. 23, 2009.

* cited by examiner

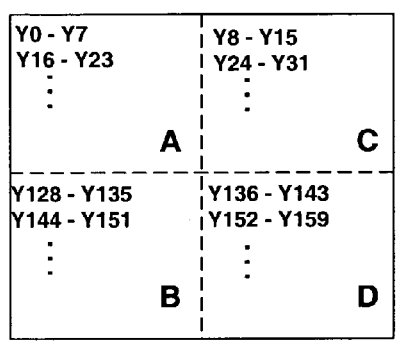
FIG. 6A　　　　FIG. 6B
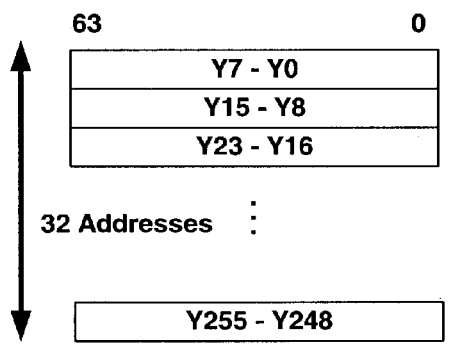
FIG. 6C
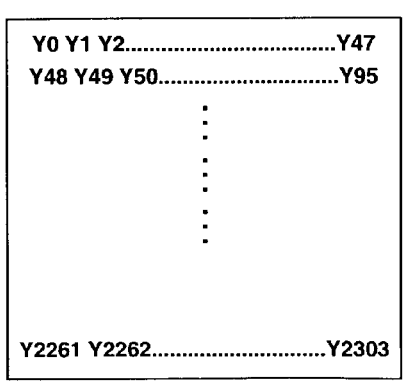
FIG. 7A　　　　FIG. 7B

```
Y0 Y1 Y2............................Y15
Y16 Y17 Y18..........................Y31
          .
          .
          .
          .
          .
Y752 Y753........................Y767
```

VIDEO ENCODING AND DECODING TECHNIQUES

This application claims the benefit of provisional U.S. Application Ser. No. 60/390,101, entitled "Method to Reduce Power Consumption in a Video Motion Estimation System" filed on Jun. 18, 2002, assigned to the assignee of the present application, and incorporated herein by reference in its entirety for all purposes.

RELATED APPLICATIONS

This application is related to co-pending patent application filed on the same date herewith, entitled "TECHNIQUES FOR VIDEO ENCODING AND DECODING," Ser. No. 10/371,768. This application is further related to co-pending patent application entitled "VIDEO ENCODING TECHNIQUES," Ser. No. 10/139,772, filed on May 3, 2002. Both applications are assigned to the same Assignee as the present application.

TECHNICAL FIELD

This disclosure relates to digital video processing and, more particularly, encoding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video encoding standards have been established for encoding digital video sequences. The Moving Picture Experts Group (MPEG), for example, has developed a number of standards including MPEG-1, MPEG-2 and MPEG-4. Other standards include ITU H.263, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc.

Many video encoding standards achieve increased transmission rates by encoding data in a compressed fashion. Compression can reduce the overall amount of data that needs to be transmitted for effective transmission of video frames. The MPEG standards, for example, utilize graphics and video compression techniques designed to facilitate video and image transmission over a narrower bandwidth than can be achieved without the compression.

The MPEG standards, for example, support video encoding techniques that utilize similarities between successive video frames, referred to as temporal or inter-frame correlation, to provide inter-frame compression. The inter-frame compression techniques exploit data redundancy across frames by converting pixel-based representations of video frames to motion representations. In addition, the video encoding techniques may utilize similarities within frames, referred to as spatial or intra-frame correlation, to further compress the video frames. Intra-frame compression is typically based upon texture encoding for compressing still images, such as discrete cosine transform (DCT) encoding.

To support compression, a digital video device typically includes an encoder for compressing digital video sequences, and a decoder for decompressing the digital video sequences. In many cases, the encoder and decoder form an integrated encoder/decoder (CODEC) that operates on blocks of pixels within frames that define the sequence of video images. In the MPEG-4 standard, for example, the encoder typically divides a video frame to be transmitted into macroblocks comprising 16 by 16 pixel arrays.

For each macroblock in the video frame, an encoder searches macroblocks of the immediately preceding video frame (or subsequent frame) to identify the most similar macroblock, and encodes the differences between the macroblocks for transmission, along with a motion vector that indicates which macroblock from the previous frame was used for encoding. A decoder receives the motion vector and encoded differences, and performs motion compensation to generate video sequences.

The video encoding process is computationally intensive, particularly when motion estimation techniques are used. For example, the process of comparing a video block to be encoded to video blocks of a previously transmitted frame requires large numbers of computations. Improved encoding techniques are highly desirable, particularly for use in wireless devices or other portable video devices where computational resources are more limited and power consumption is a concern. At the same time, improved compression is desirable to reduce the bandwidth required for effective transmission of video sequences. Improving one or more of these factors may facilitate or improve real-time encoding of video sequences, particularly in wireless and other limited-bandwidth settings.

SUMMARY

This disclosure describes video encoding techniques capable of reducing the number of processing cycles and memory transfers necessary to encode a video sequence. In this manner, the disclosed video encoding techniques may increase video encoding speed and reduce power consumption. In addition, the techniques may use the same set of computations to define difference values associated with a macroblock to be encoded, and to define difference values associated with various microblocks that form the macroblock to be encoded.

The video encoding techniques described herein may use a candidate memory that stores a search space for a motion estimation routine in a column-wise fashion. A memory control unit can address the candidate memory to retrieve multiple pixels in parallel for simultaneous comparison to pixels of a video block to be encoded, e.g., using Sum of Absolute Difference (SAD) or Sum of Squared Difference (SSD) techniques. A difference processor may perform the computations in parallel. Each set of parallel computations may correspond to a row of one of the microblocks that forms a macroblock. In addition, for subsequent video blocks to be encoded, the candidate memory can be incrementally updated by loading a new column of video blocks, rather than reloading the entire search space.

These and other techniques described herein may be implemented in a digital video device in hardware, software, firmware, or any combination thereof. If implemented in software, the techniques may be directed to a computer readable medium comprising program code, that when executed, performs one or more of the encoding techniques described herein. Additional details of various embodiments are set forth in the accompanying drawings and the description below. Other features, objects and advantages will become apparent from the description and drawings, and from the claims.

BRIEF DESCRIPTION OF DRAWINGS

FIG. 6A is a diagram illustrating a macroblock pixel index.

FIG. 6B is a diagram illustrating an arrangement of video data within video memory.

FIG. 6C is a diagram illustrating an arrangement of video data within encoding memory.

FIG. 7A is a diagram illustrating a search space pixel index.

FIG. 7B is a diagram illustrating an arrangement of a search space within video memory.

DETAILED DESCRIPTION

In general, this disclosure is directed to video encoding techniques that can be used to improve encoding of digital video data. The video encoding techniques may reduce the number of processing cycles and memory transfers necessary to encode a video sequence, thereby increasing video encoding speed and reducing power consumption. For example, the video encoding techniques may offer increased computational efficiency, particularly for the motion estimation process, which typically is the most computationally intensive aspect of the video encoding process. In addition, the video encoding techniques may be compatible with decoding standards such as the MPEG-4 decoding standard.

The video encoding techniques may be implemented in a variety of digital video devices such as digital broadcast systems, personal digital assistants (PDAs), laptop computers, desktop computers, digital cameras, digital recording devices, mobile telephones, and the like. The video encoding techniques may improve the efficiency of video encoding according to standards such as MPEG-4, and better facilitate the implementation of video encoding within wireless communication devices, such as mobile telephones, in which computational resources are more limited and power consumption is a concern.

The video encoding techniques may employ a candidate memory that stores video blocks in a search space in a column-wise fashion. A memory control unit addresses the candidate memory to retrieve multiple pixels in parallel for simultaneous comparison to pixels in a video block to be encoded, e.g., using Sum of Absolute Difference (SAD) or Sum of Squared Difference (SSD) techniques. A difference processor performs the parallel calculations. After a number of cycles of parallel computations, the difference processor can generate a search result in the form a difference value (sometimes referred to as a difference metric) associated with the candidate video block of the search space being compared to the video block to be encoded. In addition, for subsequent video blocks to be encoded, the candidate memory can be incrementally updated by loading a new column of video blocks, rather than reloading the entire search space. Such column updates can decrease power consumption and system bus usage, and may decrease the time it takes to load a new search space.

Figure 1:
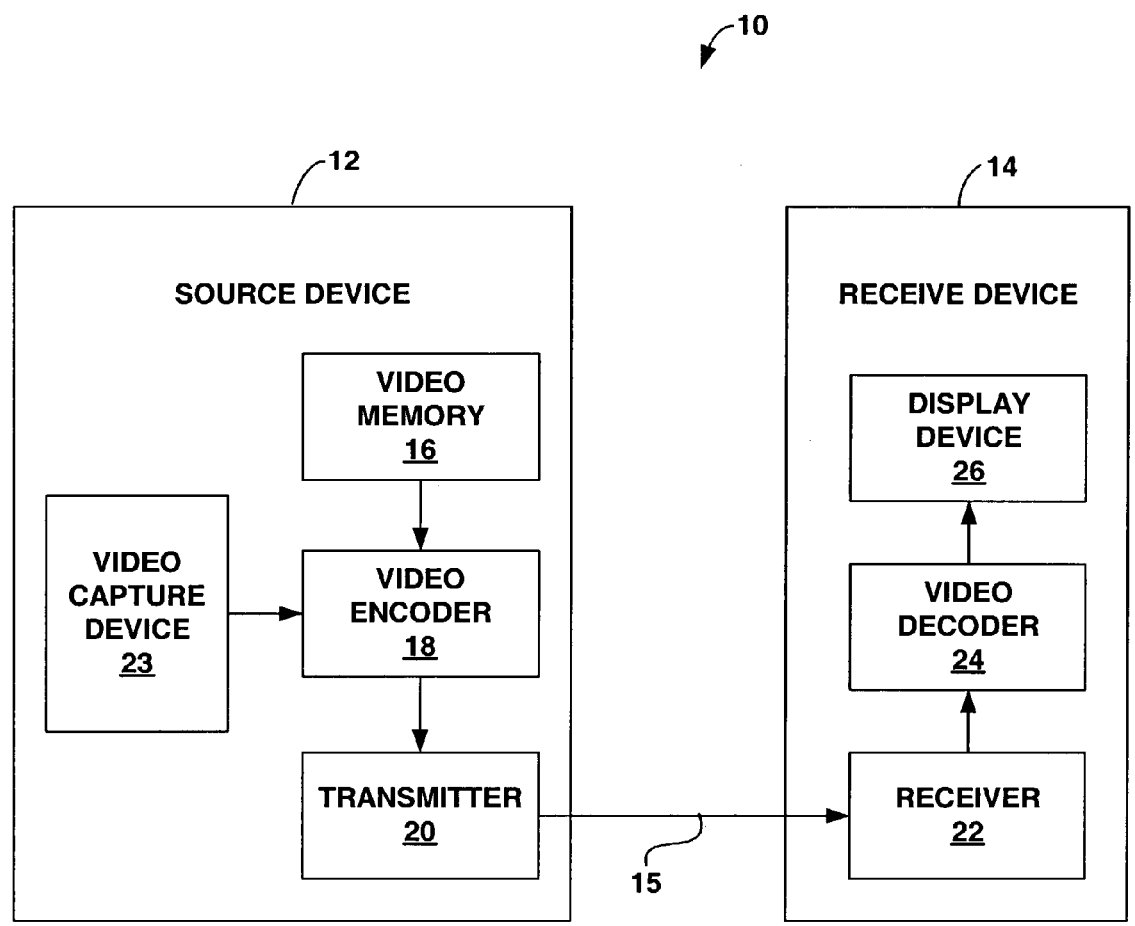
FIG. 1 is a block diagram illustrating an example system in which a source digital video device transmits an encoded sequence of video data to a receive digital video device.

FIG. 1 is a block diagram illustrating an example system 10 in which a source device 12 transmits an encoded sequence of video data to a receive device 14 via a communication link 15. Source device 12 and receive device 14 are both digital video devices. In particular, source device 12 encodes and transmits video data using any one of a variety of video compression standards, e.g., MPEG-4 developed by the Moving Picture Experts Group. Other standards may include MPEG-1, MPEG-2 or other MPEG standards developed by the Moving Picture Experts Group, ITU H.263 and similar standards, Motion JPEG 2000, QuickTime™ technology developed by Apple Computer of Cupertino Calif., Video for Windows™ developed by Microsoft Corporation of Redmond, Wash., Indeo™ developed by Intel Corporation, and Cinepak™ developed by SuperMac Inc.

Communication link 15 may comprise a wireless link, a physical transmission line, a packet based network such as a local area network, wide-area network, or global network such as the Internet, a public switched telephone network (PSTN), or the like. Thus, communication link 15 represents any suitable communication medium, or possibly a collection of different networks and links, for transmitting video data from source device 12 to receive device 14.

Source device 12 may be any digital video device capable of encoding and transmitting video data. For example, source device 12 may include a video memory 16 to store digital video sequences, a video encoder 18 to encode the sequences, and a transmitter 20 to transmit the encoded sequences over communication link 15 to source device 14. Video encoder 18 may include, for example, a digital signal processor (DSP) that executes one or more programmable software modules to control the video encoding techniques. Associated memory and logic circuitry may be provided to support the DSP in controlling the video encoding techniques. As will be described, video encoder 18 may be configured to reduce processing cycles, memory transfers, and power consumption. In addition, video encoder 18 can be configured to perform a set of computations to generate a difference value for a macroblock as well as various difference values of microblocks that form the macroblock.

In addition, source device 12 may include a video capture device 23, such as a video camera, to capture video sequences and store the captured sequences in memory 16. In particular, video capture device 23 may include a charge coupled device (CCD), a charge injection device, an array of photodiodes, a complementary metal oxide semiconductor (CMOS) device, or any other photosensitive device capable of capturing video images or digital video sequences.

As further examples, video capture device 23 may be a video converter that converts analog video data to digital video data, e.g., from a television, video cassette recorder, camcorder or the like. In some embodiments, source device 12 may be configured to transmit real-time video sequences over communication link 15. In that case, receive device 14 may receive the real-time video sequences and display the video sequences to a user. Alternatively, source device 12 may capture and encode video sequences that are sent to receive device 14 as video data files, i.e., not in real-time. Thus, source device 12 and receive device 14 may support applications such as video clip playback, video mail, or video conferencing, e.g., in a mobile wireless network.

Receive device 14 may take the form of any digital video device capable of receiving and decoding video data. For example, receive device 14 may include a receiver 22 to receive encoded digital video sequences from transmitter 20, e.g., via intermediate links, routers, other network equipment, and like. Receive device 14 also may include a video decoder 24 for decoding the sequences, and a display device 26 to display the sequences to a user. In some embodiments, receive device 14 may not include an integrated display device 14. Rather, receive device 14 may serve as a receiver that decodes the received video data to drive a discrete display device, e.g., a television or monitor.

Example devices for source device 12 and receive device 14 include servers located on a computer network, workstations or other desktop computing devices, and mobile computing devices such as laptop computers or personal digital assistants (PDAs). Other examples include digital television broadcasting satellites and receiving devices such as digital televisions, digital cameras, digital video cameras or other digital recording devices, digital video telephones such as mobile telephones having video capabilities, other wireless video devices, and the like.

In some cases, source device 12 and receive device 14 each include an encoder/decoder (CODEC) (not shown) for encoding and decoding digital video data. In that case, both source device 12 and receive device 14 may include transmitters and receivers as well as memory and displays. Many of the encoding techniques outlined below are described in the context of a digital video device that includes an encoder. It is understood, however, that the encoder may form part of a CODEC. In that case, the CODEC may be implemented with a DSP, a microprocessor, an application specific integrated circuit (ASIC), discrete hardware components, or various combinations thereof.

Video encoder 18 within source device 12 operates on blocks of pixels within a sequence of video frames in order to encode the video data. For example, video encoder 18 may execute motion estimation encoding techniques in which a video frame to be transmitted is divided into blocks of pixels (referred to as video blocks). The video blocks, for purposes of illustration, may comprise microblocks and macroblocks. As an example, a microblock may be an 8 by 8 array of pixels. A macroblock may be a 16 by 16 array of pixels. Hence, a macroblock may contain four microblocks. Such a format is often used in MPEG-4 compliant encoding techniques. However, other microblock and macroblock sizes can be used. In general, in this disclosure, the terms macroblock and microblock refer to a video blocks comprising a plurality of pixels. A macroblock is further defined as a plurality of microblocks. The number of microblocks that define a macroblock, the number of pixels that define a microblock, as well as the number of pixels that define a macroblock are subject to a wide variety of implementation-specific formats.

At times, improved resolution can be achieved by calculating motion estimation of microblocks rather than macroblocks. Moreover, as outlined in greater detail below, the pixels of a macroblock may be stored or addressed in a manner that allows for calculation of difference values, also referred to as difference metrics, for the smaller microblocks in parallel with the calculation of the difference values of the macroblock. In other words, the calculation of a difference metric of a macroblock may be viewed as a series of four calculations of difference metrics for the four microblocks that form the macroblock. Accordingly, difference metrics for a macroblock, as well as the microblocks that form the macroblock can be generated from the same calculations. In particular, such a technique may be facilitated without adding additional SAD or SSD computations. Rather, an addressing and computational scheme can be designed so that the same computations can be interpreted by the encoder as being computations of a microblock difference value and computations of a macroblock difference value.

Each pixel in a microblock or macroblock may be represented by an n-bit value, e.g., 8 bits, that defines visual characteristics of the pixel such as color and intensity, e.g., chrominance and luminance. However, motion estimation ordinarily is performed only on the luminance component because human vision is more sensitive to changes in luminance than color. Accordingly, for purposes of motion estimation, the entire n-bit value maybe quantifying luminance for a given pixel. The principles of this disclosure, however, are not limited to the format of the pixels, and may be extended for use with more simple fewer-bit pixel formats or more complex larger-bit pixel formats.

For each video block in the video frame, video encoder 18 of source device 12 searches video blocks stored in memory 16 for the preceding video frame already transmitted (or a subsequent video frame) to identify a similar video block, and encodes the difference between the video blocks, along with a motion vector that identifies the video block from the previous frame (or subsequent frame) that was used for encoding. In this manner, instead of encoding each frame as an independent picture, video encoder 18 encodes the difference between adjacent frames. Motion estimation involves identification of the microblock or macroblock, in a previous or subsequent frame, that best matches a microblock or macroblock in a current frame to be encoded.

The motion vector may define a pixel location associated with the upper-left-hand corner of the video block, although other formats for motion vectors could be used. In any case, by encoding video blocks using motion vectors, the required bandwidth for transmission of streams of video data can be significantly reduced. In some cases, source device 12 may support programmable thresholds which can cause termination of various comparisons or computations during the encoding process in order to reduce the number of computations and conserve power.

Receiver 22 of receive device 14 may receive the encoded video data in the form of motion vectors and encoded differences. Decoder 24 performs motion compensation techniques to generate video sequences for display to a user via display device 26. The decoder 24 of receive device 14 may also be implemented as an encoder/decoder (CODEC). In that case, both source device 12 and receive device 14 may be capable of encoding, transmitting, receiving and decoding digital video sequences.

Figure 2:
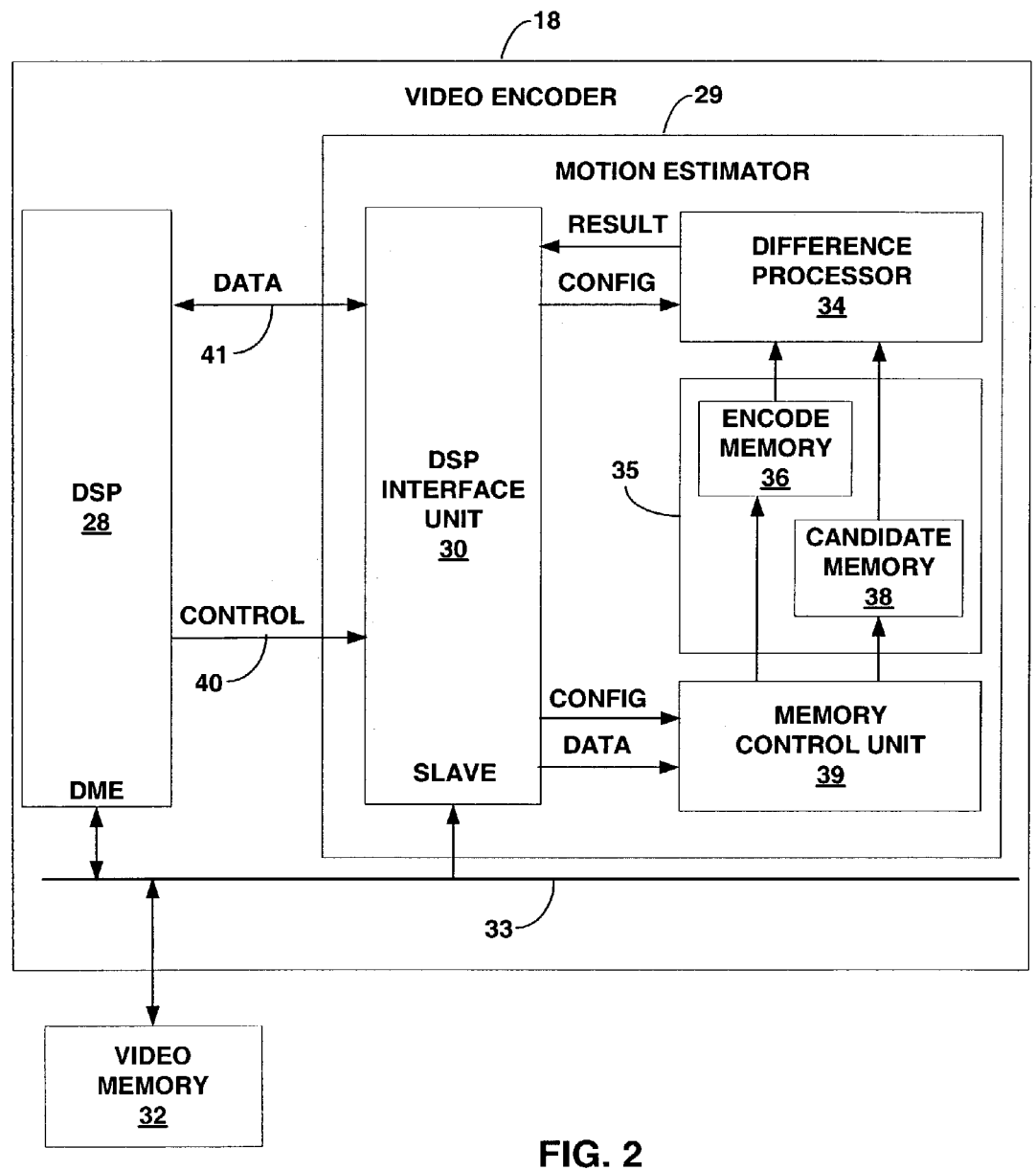
FIG. 2 is a block diagram illustrating a video encoder that encodes digital video sequences.

FIG. 2 is a block diagram illustrating a video encoder 18 that encodes digital video sequences according to the techniques described herein. FIG. 2 represents an exemplary implementation, and should not be considered limiting of the disclosure. As shown in FIG. 2, video encoder 18 may include a digital signal processor (DSP) 28 and a motion estimator 29. DSP 28 controls the operation of motion estimator 29, and serves as a video encoding controller. Alternatively, a video encoding controller can be realized by a processor, hardware components, firmware, an application specific integrated circuit (ASIC), a field programmable gate array (FPGA), or the like.

In the example of FIG. 2, DSP 28 executes one or more programmable software modules to control the video encoding techniques. Motion estimator 29 may include a DSP interface 30. DSP 28, DSP interface 30 and video memory 32 communicate via a bus 33. Video memory 32 may be viewed as an external component to video encoder 18 or may be integrated as part of video encoder 18. DSP interface 30 interacts with a difference processor 34 that performs computations associated with a motion estimation routine. Difference processor 34 may perform SAD or SSD calculations, for example, to compute motion vectors for blocks or macroblocks to be encoded for a given video frame. By imparting control of the encoding algorithm to DSP 28, and separating the computationally intensive motion estimation for calculation within hardware of motion estimator 29, the ability to support real-time encoding can be enhanced.

A difference processor memory 35, as further shown in FIG. 2, includes an encode memory 36 and a candidate memory 38. Encode memory 36 stores a current macroblock to be encoded using the motion estimation routine. The current macroblock corresponds to one of an array of macroblocks in a video frame to be encoded. Candidate memory 38 stores an array of macroblocks from a different frame that forms a search space. Difference processor 34 compares the macroblocks in candidate memory 38 to the current macroblock in encode memory 36 to identify the best match for use as a motion vector. As an example, a search space of 48 by 48 pixels may be used. In that case, the search space would contain nine macroblocks, i.e., three columns of three macroblocks, each containing a 16 by 16 array of pixels. Other macroblocks can also be defined within the 48 by 48 pixel array search space to include pixels from two or more of the nine macroblocks that define the search space.

A memory control unit 39 controls addressing of candidate memory 38 and encode memory 36 to drive the search process for the motion estimation routine. In particular, memory control unit 39 controls loading of pixel data from video memory 32 via bus 33 to candidate memory 38 to form the search space. For this purpose, memory control unit 39 may be equipped to provide memory address translation. Loading the entire 48 by 48 pixel search space directly into candidate memory 38 without intervention by DSP 28 can reduce bus activity between DSP 28 and DSP interface unit 30, and reduce the required number of instructions in DSP 28 needed to move the video data. Difference processor 34 determines SAD or SSD results for each macroblock and returns the best matched result to DSP interface 30. DSP interface 30, in turn, provides the encoded macroblock and motion vector to DSP 28 for storage in video memory 32 via bus 33.

In operation, DSP 28 may control DSP interface unit 30 to drive the search process via a control channel 40. In general, control channel 40 is used for a memory loading command, which may include a pixel index for a search space to be loaded into candidate memory 38. Each pixel index may indicate the address of the upper left corner or a candidate macroblock, although other formats could be used. In addition, DSP 28 may receive the search results generated by difference processor 34 via a data channel 41. Data channel 41 also may be used for hardware configuration and mode switching. Memory transfers between DSP 28 and video memory 32 may be accomplished via a Direct Memory Exchange (DME) port on the DSP and bus 33. In this case, DSP interface unit 30, difference processor 34, encode memory 36, candidate memory 38 and memory control unit 39 may reside within the overall motion estimator (ME) controlled by DSP 28. In general, the DME is used for fetching data from video memory 32 for loading into encode memory 36 and candidate memory 38.

In the example of FIG. 2, DSP interface unit 30 serves as a slave for memory transfers from video memory 32 to encode memory 36 and candidate memory 38 via bus 33 and memory control unit 39. Initially, DSP interface unit 30 may load the entire search space into candidate memory 38. Thereafter, DSP interface unit 30 may incrementally update candidate memory 38, e.g., to add a new column to the search space as the next block in a given frame is to be encoded. DSP interface unit 30 may have data and configuration channels for transfer of video data and configuration of memory control unit 39. In addition, DSP interface unit 30 may have a configuration channel for controlling the search process performed by difference processor 34 and a result channel for receiving the search results.

In the example of FIG. 2, video encoder 18 provides compressed digital video sequences to a host source device 12 for transmission to a receive device 14. Video encoder 18 encodes the video sequences and buffers the encoded digital video sequences within video memory 32 prior to transmission. Video memory 32, as well as difference processor memory 35, may take the form of synchronous dynamic random access memory (SDRAM), FLASH memory, electrically erasable programmable read only memory (EEPROM), or the like. Encode memory 36 and candidate memory are typically local memories of video encoder 18, and may comprise a common memory device separated into "virtual" memories.

In addition to the components illustrated in FIG. 2, in some embodiments, video encoder 18 may include other components such as a texture encoder to perform intra-frame or inter-frame compression commonly used for compressing still images, such as discrete cosine transform (DCT) encoding. Texture encoding, for example, may be performed in addition to motion estimation, or possibly in lieu of motion estimation, in scenarios where processing capabilities are deemed too limited for effective motion estimation. DSP 28 may direct the encoding routine by selectively invoking motion estimator (29) and texture encoder (not shown) based on processing capabilities at any given time.

Figure 3:
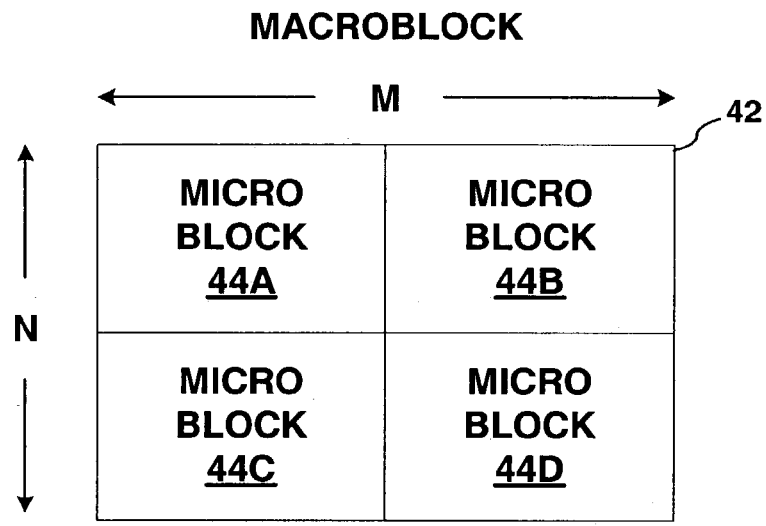
FIG. 3 is a conceptual illustration of an example macroblock of video data.

FIG. 3 illustrates an example video block in the form of a macroblock 42 that can be stored within video memory 32 with a video frame. MPEG standards and other video encoding schemes make use of video blocks in the form of macroblocks during motion estimation video encoding. As mentioned above, in MPEG-4 compliant systems, the term "macroblock" refers to a 16 by 16 collection of pixel values that forms a subset of a video frame. Each pixel value may be represented by a byte of data, although larger or smaller number of bits could also be used to define each pixel in order to achieve the desired imaging quality. A macroblock may comprise a number of smaller 8 by 8 pixel microblocks 44A-44D. In general, however, the encoding techniques described herein may operate using blocks of any defined size, such as 16-byte by 16-byte macroblocks, 8-byte by 8-byte microblocks blocks, or differently sized video blocks, if desired.

Figure 4:
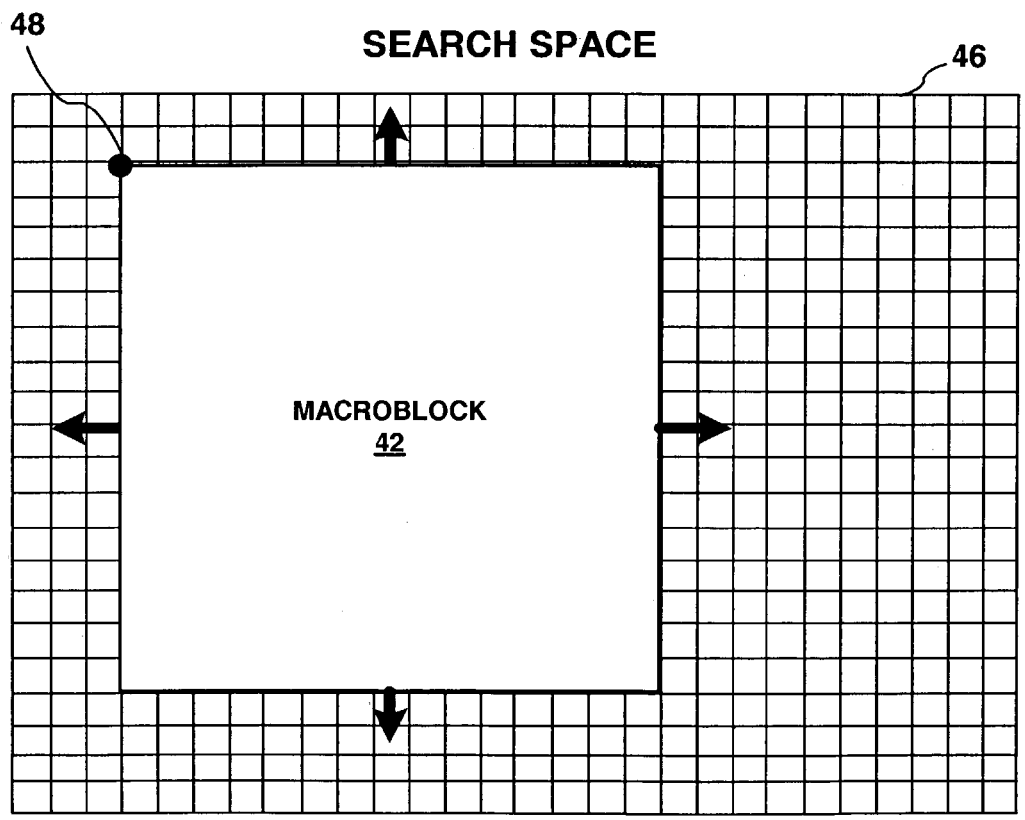
FIG. 4 is a conceptual illustration of an example search space.

FIG. 4 illustrates an example portion of search space 46 that can be stored within candidate memory 38. Search space 46 is a collection of pixels corresponding to a previously transmitted video frame (or a subsequent video frame of a sequence of frames). The search space may comprise the previous or subsequent video frame in its entirety, or a subset of the video frame, if desired. The search space may be rectangular-shaped, as illustrated, or may assume any of a wide variety of shapes and sizes.

During video encoding, the current macroblock to be encoded is compared to video blocks in search space 46 in order to identify an adequate match so that the differences between the current macroblock and the similar macroblock in the search space can be transmitted along with a motion vector that identifies the similar video block. As mentioned above, the macroblocks 48 defined within search space 46 can be stored in candidate memory 38, while the current macroblock to be encoded can be stored in encode memory 36.

During motion estimation video encoding, difference processor 34 can compare a current macroblock to be encoded with macroblocks of previous or subsequent frames using comparison techniques such as the SAD and SSD techniques. As indicated in FIG. 4, a macroblock 48 within search space 46 can be identified by the upper left-hand pixel address 48 for the respective macroblock. Other comparison techniques may also be used. Notably, in accordance with the principles of this disclosure, SAD or SSD calculations can be made in parallel for multiple pixels. Moreover, addressing and computational order of the pixel-wise comparisons can be done in a manner that causes generation of difference values for each macroblock to be encoded, as well as difference values for the microblocks that form the macroblock.

In this disclosure, the term "task" refers to a common set of computations used to compare a current video block to a different video block within a search space. In other words, a task refers to a single comparison between a current video block and a different video block in the search space. For example, a task may involve performing a number of computations in order to compare a number of pixels of the current video block to those of the candidate video block in the search space. As described herein, various subsets of these task computations may be performed in parallel to speed the encoding process. 64 computations may be viewed as a microblock task (assuming microblocks are defined as 8 by 8 pixel arrays), and 256 computations may be viewed as a macroblock task (assuming macroblocks are defined as 16 by 16 pixel arrays). During each task, the computations are accumulated to define an ongoing difference value for the task (sometimes referred to as a difference metric).

In this disclosure, the term "iteration" refers to a common set of tasks performed during video encoding. A complete series of tasks associated with a current video block to be encoded is an iteration. In other words, an iteration is a set of comparisons in which a current video block is compared to a set of previous video blocks (or subsequent video blocks) in the search space. Each individual comparison is a task that involves a number of computations. Thus, a search space defines a set of video blocks that are compared to a current video block during an iteration. Each comparison of an iteration is referred to as a task, and each task, i.e., each comparison, may involve a number of computations.

In some cases, an iteration may include defining a first search on a search space, identifying a first match in the search space, defining a second search on a subset of the search space based on the first match, and identifying a second match in the subset. For example, later searches of the iteration may involve slight shifts within the search space to more adequately pinpoint the best match. Other searching techniques could also be used such as diamond searching techniques in which searches continue until a pixel location identifying a macroblock yielding a lowest difference value is centered at a center of a diamond shaped search parameter. In addition, other techniques such as circle-searching techniques may be used in which a pixel location identifying a macroblock yielding a lowest difference value is centered at a center of a search parameter defined by a radius (R). The circle of radius (R) can define a larger, more inclusive search parameter, than diamond searching parameters.

If diamond searching techniques or circle-searching techniques are used during an iteration, initialization techniques may also be employed to speed the process of identifying a macroblock yielding a lowest difference value in the center of the diamond shaped search parameter or the circularly defined search parameter. For example, an initialization technique that exploits the phenomenon of spatial redundancy may be used. Spatial redundancy generally predicts that video motion of a given video block will likely be similar to the video motion of another video block in close spatial proximity to the given video block. The initialization technique can more readily exploit this phenomenon to initialize motion estimation in a location within a search space that has a very high probability of including a video block that can be used for effective video encoding.

More specifically, the initialization technique may utilize motion vectors calculated for video blocks in close spatial proximity to a video block to be encoded in order to identify a location within the search space where a motion estimation routine can be initialized, i.e., the pixel location within the search space where the motion estimation routine commences. For example, a mean pixel location, a median pixel location or a pixel location calculated using a weighted function may be calculated based on motion vectors previously determined for video blocks in close spatial proximity to a current video block to be encoded. Other linear or non-linear functions could also be used. In any case, by initializing the motion estimation routine in this manner, video encoding may be accelerated in the diamond searching or circle-searching scenarios by reducing the number of tasks in an iteration required to locate a video block within the search space that is an acceptable match to the video block being encoded.

The computations used for generating the difference values may involve SAD techniques, SSD techniques, or other comparison techniques, if desired. The SAD technique involves the task of performing absolute difference computations between pixel values of the current macroblock to be encoded, with pixel values of the previous macroblock to which the current macroblock is being compared. The results of these absolute difference computations are summed, i.e., accumulated, in order to define a difference value indicative of the difference between the current macroblock and the previous macroblock to which the current video block is being compared. For an 8 by 8 pixel image block, 64 differences may be computed and summed, and for a 16 by 16 pixel macroblock, 256 differences may be computed and summed. By addressing the current video block and performing computation in a specific order, the 256 differences may be computed, but also summed in four separate sets so that difference values can be generated for each microblock. The overall summation of all of the computations of the four sets, then, can define the difference value for the macroblock.

A lower difference value generally indicates that a macroblock being compared to a current macroblock is a better match, and thus a better candidate for use in motion estimation encoding than candidate macroblocks yielding higher difference values, i.e. increased distortion. In some cases, computations may be terminated when an accumulated difference value exceeds a defined threshold. In that case, additional computations may be unnecessary because the macroblock being compared to the current video block would not be acceptable for effective use in motion estimation encoding.

The SSD technique also involves the task of performing difference computations between pixel values of the current macroblock to be encoded with pixel values of the previous macroblock to which the current macroblock is being compared. However, in the SSD technique, the results of absolute difference computations are squared, and then the squared values are summed, i.e., accumulated, in order to define a difference value indicative of the difference between the current macroblock and the previous macroblock to which the current macro block is being compared. Alternatively, other comparison techniques such as a Mean Square Error (MSE), a Normalized Cross Correlation Function (NCCF), or another suitable comparison algorithm may be performed.

In some cases, various tasks or iterations may be terminated early upon determining, for example, that a given task will not yield a better match than a previous task, or upon identifying that a given task yields an acceptable match. For example, techniques can be used to identify when additional computations for a given task are unnecessary. More specifically, when a subset of computations of a second task collectively yield a difference value larger than that associated with a previously calculated first task, it is generally known that the additional computations for the second task are unnecessary because completion of the second task will not result in a lower difference value than the first task. In that case, the second task can be terminated without sacrificing encoding performance, and execution of a third task can begin more quickly.

Termination techniques may also be executed at the iteration level, or both at the task level and iteration level. In one example, an iteration threshold defines a value that is acceptable, i.e., adequate for effective video encoding. In that case, if a task is performed which identifies a candidate video block in the search space that matches the current video block to be encoded in a manner that is deemed acceptable by the iteration threshold, the iteration can be terminated, and the next video block to be encoded can be compared to the search space. In that case, the execution of a number of unnecessary tasks can be avoided.

Many of the techniques herein are described in the context of comparing a video block to be encoded to previous video blocks of a previous video frame. It is understood, however, that the same techniques may be used when comparing the video block to be encoded to candidate video blocks of a subsequent video frame. In some cases, bi-directional motion estimation is used, wherein the video block to be encoded is compared to various candidate video blocks of one or more previous video frames and various video blocks of subsequent video frames. In short, many techniques described herein may be used whenever a video block to be encoded is being compared to a different video block, such as a candidate video block of a previous video frame or a candidate video block of a subsequent video frame. In other words, the search space may be loaded with various different candidates in various different implementations.

Figure 5:
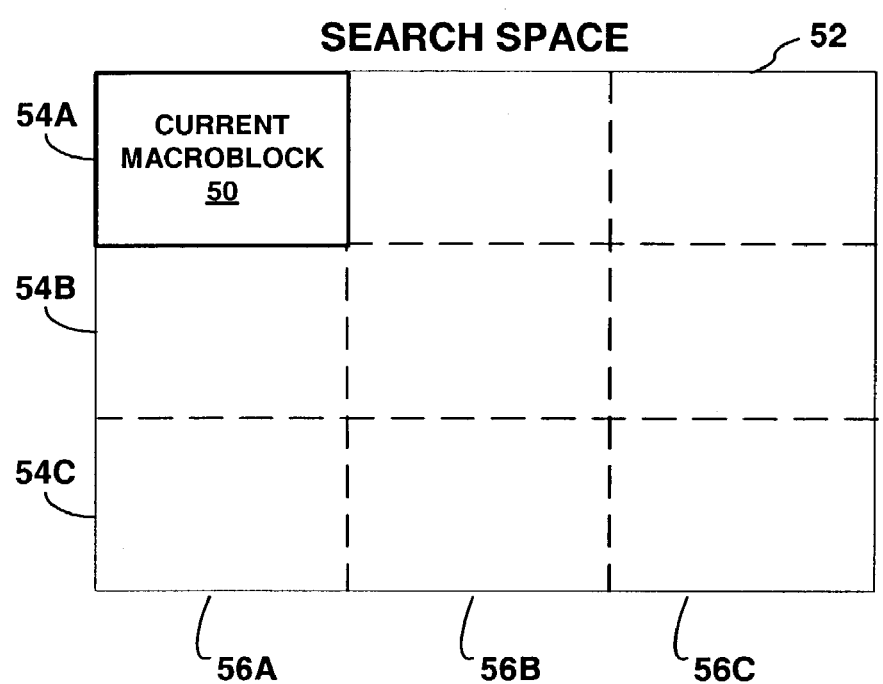
FIG. 5 is a conceptual illustration of a macroblock to be encoded conceptually positioned over a search space arranged as an array of macroblocks.

FIG. 5 is a conceptual illustration of a current macroblock 50 to be encoded within an exemplary search space 52 arranged as an array of candidate macroblocks. In particular, as shown in FIG. 5, search space 52 includes three rows 54A-54C and three columns 56A-56C of candidate macroblocks for comparison to the macroblock 50 to be encoded. Hence, in the example of FIG. 5, search space 52 comprises an array of nine 16 by 16 pixel macroblocks, forming a 48 by 48 pixel area. The current macroblock 50 to be encoded is compared to the macroblocks in search space 52 using difference processor 34.

To reduce memory transfers between video memory 32 and candidate memory 38 and associated processing overhead, once search space 52 has been initially loaded, subsequent updates to the search space can be made on a column-by-column basis, as needed. For example, to encode a subsequent macroblock of a given frame, memory control unit 39 may simply replace the candidate macroblocks in left-hand column 56A of search space 52, rather than reloading the entire search space 52.

To accomplish a column-wise update, and permit parallel motion estimation calculations to be performed on multiple pixels simultaneously, memory control unit 39 is configured to carry out an address mapping scheme for translation between the memory addresses maintained in video memory 32, encode memory 36 and candidate memory 38. The data update for encode memory 36 and candidate memory 38 takes place between video memory 32 via bus 33, which accesses the video memory directly. To initialize and control this transfer over bus 33, DSP 28 serves as the bus master via the DME port.

FIG. 6A is a diagram illustrating a macroblock pixel index. As shown in FIG. 6A, the macroblock pixel index may be divided into four microblocks (A, B, C,. D). The macroblock pixel index is 16 by 16, whereas each of the microblocks A, B, C, D is 8 by 8. The entire macroblock pixel index extends from the upper left hand pixel Y0 to the lower right hand pixel Y255 (not shown). The pixel index is maintained by DSP 28 to track the macroblocks within the search space. Memory control unit 39 serves to translate the pixel index provided by DSP 28 to the address of the physical memory in video memory 32, encode memory 36 or candidate memory 38, as applicable. For example, memory control unit 39 supplies the translated address to candidate memory 38 for search space update or to encode memory 36 for SAD computation by SAD engine 34.

FIG. 6B is a diagram illustrating an arrangement of video data within video memory 32. In particular, FIG. 6B illustrates the difference between the macroblock pixel index maintained by DSP 28 and the physical arrangement of the macroblock pixel data within video memory 32. As shown in FIG. 6B, video memory 32 stores the macroblock pixel data at 64 addresses arranged in rows of four pixels, producing 64 rows for each macroblock. At 8 bits per pixel, each row contains 32 bits of data. Thus, to access video memory 32 in response to a pixel index from DSP 28, memory control unit 39 needs to translate the pixel index to the physical address in the video memory.

FIG. 6C is a diagram illustrating an arrangement of video data within encode memory 34. As shown in FIG. 6C, the macroblock pixel data stored in encode memory 36 is arranged in 32 rows of eight pixels per row, i.e., 64 bits per row. In accordance with this disclosure, the memory arrangement in encode memory 36 facilitates parallel absolute difference (AD) computation by difference processor 34 for multiple pixels simultaneously. In particular, the example of FIG. 6C is a physical arrangement of encode memory 36 that permits parallel AD computation for 8 pixels at a time. Moreover, when microblocks are defined to have 8-pixel widths, the physical arrangement of FIG. 6C may allow for difference values to be generated for microblocks, as well as the macroblock because the microblocks typically have 8-pixel widths. The width of encode memory 36 may be 64 bits. Together, FIGS. 6A-6C illustrate how the macroblock pixel index is mapped to video memory 32 and how the video memory is then mapped to the physical encode memory 36 in difference processor memory 35.

FIG. 7A is a diagram illustrating a search space pixel index maintained by DSP 28. The pixel index within the search space is used by DSP 28 to specify a search task, e.g., a set of computations used to create the result (difference value) generated by difference processor 34. The search space pixel index of FIG. 7A corresponds to a 3 macroblock by 3 macroblock search space, and therefore contains 2304 pixels (3*3*16*16). As further shown in FIG. 7A, the search space pixel index contains 48 rows, each containing 48 pixels.

FIG. 7B is a diagram illustrating an arrangement of a search space within video memory 32. As shown in FIG. 7B, the physical arrangement of the search space pixels includes 4 pixels per row, as in the macroblock memory arrangement of FIG. 6B. In addition, the pixels are arranged in 576 rows. At 8 bits per pixel, each row of 4 pixels contains 32 bits.

Figure 7C:
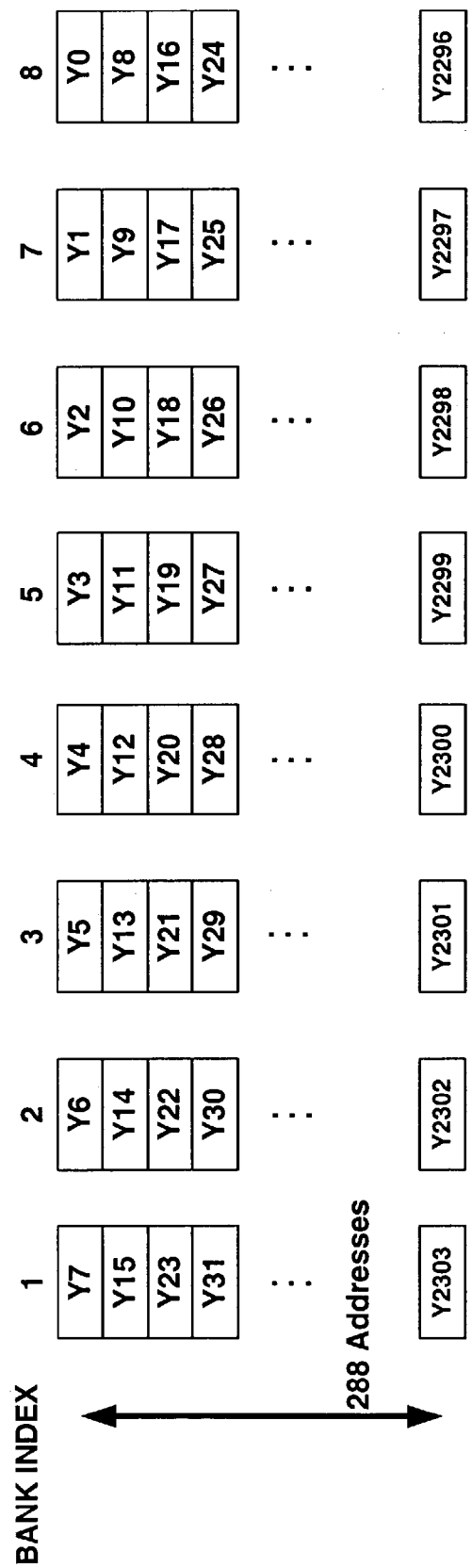
FIG. 7C is a diagram illustrating arrangement of a search space within candidate memory.

FIG. 7C is a diagram illustrating arrangement of a search space within candidate memory 38. Notably, like encode memory 36, candidate memory 38 is arranged in rows of 8 pixels. To store the entire search space, candidate memory 38 includes 288 rows. In other words, candidate memory 38 is arranged as 8 banks of 288 by 8 bit memory. Each row is 64 bits wide. Although encode memory 36 stores only a macroblock and candidate memory 38 stores a search space that is three macroblocks wide and includes nine macroblocks total, each of the memories 36, 38 has an 8 pixel wide output. In this manner, encode memory 36 and candidate memory 38 are arranged for ready comparison of each macroblock to be encoded, i.e., to facilitate parallel computing of absolute difference values for 8 pixels at a time. In addition, encode memory 36 and candidate memory 38 are arranged for computation of microblock difference values during the computation of a macroblock difference value.

Also, in addition to permitting parallel AD computation for multiple pixels, candidate memory 38 is arranged to permit addressing of a macroblock starting at any pixel within a search space. Moreover, as will be described, the structure of candidate memory 38 may permit incremental column updates, i.e., loading of one column of macroblocks at a time, rather than reloading the entire search space for each new macroblock to be encoded. Such a loading technique can reduce power by avoiding redundant memory loads and reducing usage of bus 33. Again, memory control unit 39 is equipped to translate the search space pixel index into a physical memory address within video memory 32, and then translate the memory address from the video memory into a corresponding physical memory address in candidate memory 38.

Figures 8A, 8B:
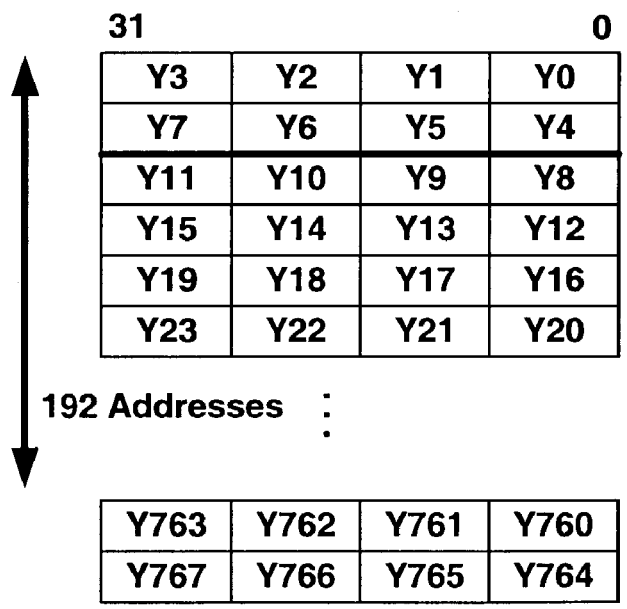
FIG. 8A is a diagram illustrating a macroblock column pixel index.
FIG. 8B is a diagram illustrating arrangement of a macroblock column within video memory.

FIG. 8A is a diagram illustrating a macroblock column pixel index. For two adjacent macroblocks to be encoded, the difference between applicable search space is only one of the macroblock columns. As a result, only one macroblock column needs to be updated. Candidate memory 38 is arranged to exploit this aspect and thereby reduce the data bandwidth required for transfers between video memory 32 and the candidate memory. As shown in FIG. 8A, the macroblock column pixel index maintained by DSP 28 may be arranged in rows of 16 pixels and extend for the length of a single column in the search space, i.e., 48 rows. Thus, the macroblock pixel index shown in FIG. 8A corresponds to a column of three macroblocks, and thus one-third of the search space pixel index of FIG. 7A.

The physical memory arrangement in video memory 32 for the macroblock column pixel index also differs from the memory arrangement for the entire search space pixel index. FIG. 8B is a diagram illustrating arrangement of a macroblock column within video memory 32. For a macroblock column, video memory 32 provides 192 rows of 4 pixels each. Hence, video memory 32 arranges the macroblock column with a width of 32 bits. Once the search space is loaded into candidate memory 38 for an initial macroblock, searches for subsequent, adjacent macroblocks to be encoded can be accomplished by simply loading a new column.

During a column update, memory control unit 39 replaces the previous left-hand macroblock column with a new macroblock column. The newly loaded macroblock column is then designated as the current right-hand macroblock column. In addition, the previous middle macroblock column is designated as the new left-hand macroblock column, while the previous right macroblock column is designated as the new middle macroblock column.

Hence, the search space can be viewed as being shifted to the right within a larger video frame to eliminate the previous left-hand macroblock column, and thereby make room for the new right-hand macroblock column. Following this column update operation, the search space in candidate memory 38 is appropriate for consideration of the next macroblock in encode memory 36.

By translating the pixel indices provided by DSP 28 to physical addresses in video memory 32 and candidate memory 38 within memory control unit 39, there is no need for the DSP to track the column shifting operations. As a result, DSP 28 merely needs to provide the pixel index for the new right-hand macroblock column.

Figure 9:
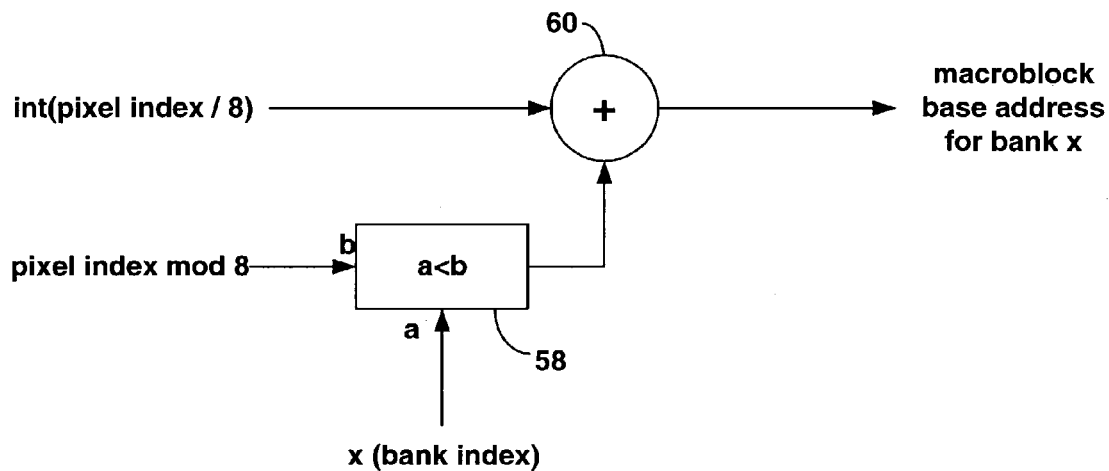
FIG. 9 is a block diagram illustrating translation of a pixel index to a base address translation for a memory bank in candidate memory.

FIG. 9 is a block diagram illustrating exemplary circuitry that forms part of memory control unit 39 for use in translation of a pixel index to a base address translation for a memory bank in candidate memory 38. As shown in FIG. 9, memory control unit 39 includes suitable logic circuitry for achieving this memory address translation. Memory control unit 39 tracks the current iteration, such as an update of encode memory 36, an update or full load of candidate memory 38 or a search task in which difference processor 34 performs the parallel AD computation for the contents of the encode memory and candidate memory. As will be described, memory control unit 39 also may track block boundaries during a search, manage the macroblock column shift in candidate memory 38, and perform pixel-to-address translation.

In general, for a search, memory control unit 39 determines the corresponding starting bank of a pixel, i.e., position within the row of eight pixels, in candidate memory 38 according the following equation:

$$\text{Bank of starting pixel} = \mod 8 \text{ (pixel index)} \quad (1)$$

In addition, memory control unit 39 determines the row of the starting pixel according to the following equation:

$$\text{Row of starting pixel} = \text{int (pixel index/8)} \quad (2)$$

Thus, according to the mod function (1), the starting bank is the remainder of the pixel index divided by 8. According to the integer divide function (2), the starting row is the highest integer divisible with the pixel index.

Given equations (1) and (2) above, the starting, or "base," address of a respective bank x can be represented as:

$$\begin{aligned}\text{Bank} \times \text{base address} &= \text{row of starting pixel, if} \quad (3)\\ &\quad x \geq \text{bank of starting pixel}\\ &\quad \text{row starting pixel} + 1, \text{if}\\ &\quad x < \text{bank of starting pixel}\end{aligned}$$

As shown in FIG. 9, a comparator 58 within memory control unit 39 compares the row indicated by the pixel index (pixel index mod 8) to the bank index and generates an output of 1 if the pixel index is less than the bank index and an output of 0 if the pixel index is greater than or equal to the bank index. An adder 60 within memory control unit 39 then adds the output of comparator 58, either 1 or 0, to the bank indicated by the pixel index [int(pixel index/8)] to produce the base address for bank x.

Figure 10:
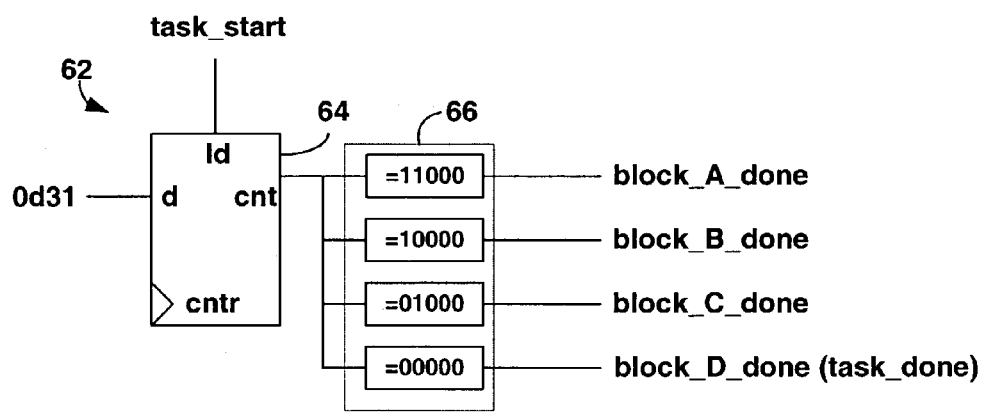
FIG. 10 is a block diagram illustrating a block counter for tracking progress of a search through a series of blocks forming a macroblock.

FIG. 10 is a block diagram illustrating a video block counter circuit 62 for tracking progress of a search through a series of microblocks (A, B, C, D) forming a macroblock, as shown in FIG. 3. Once the base address of the respective banks is determined, memory control unit 39 tracks the incremental update and reload of an address generation counter based on block boundary. In the example of FIG. 10, block counter circuit 62 may include a 5-bit counter 64 that is initially loaded with a value of 31 to provide 32 counts. Upon initialization (task_start), counter 64 counts up one count per clock cycle. A counter that counted down, however, could also be used.

When the count reaches 0b11000, decision logic 66 indicates that the search conducted by difference processor 34 has completed the AD computations for microblock A. Similarly, counts 0b10000, 0b01000 and 0b00000 indicate that microblocks B, C, and D are done. When the count 0b00000 is reached, the search is completed (task_done) for the given macroblock. In this manner, block counter circuit 62 tracks the progress of calculating the difference value for the current macroblock that is being handled by difference processor 34. In addition, block counter circuit 62 can determine when the difference values associated with each microblock has been calculated.

Upon crossing each microblock boundary, decision logic 66 generates a block_done signal that instructs difference processor 34 to latch the individual microblock result. Accordingly, video encoder 18 generates difference value results for each individual microblock as well as difference value results for the macroblock. Moreover, these different results are generated using the same respective computations. In other words, four separate subsets of computations generate each difference value for the microblocks, and the summation of all of the computations generate the difference value for the macroblock.

As mentioned above, termination techniques may be added to terminate various tasks or iterations in order to avoid computations in certain scenarios. In one implementation, the determination of whether to terminate a task can be made after performing each set of parallel AD computations. In other words, each latch of a microblock row may provide an opportune time to determine whether the task threshold has been exceeded. If so, the additional computations for that particular task can be terminated because it is known that that search will not yield the lowest difference value. In particular, if the task threshold is exceeded, the difference value for the subset of the candidate macroblock may already exceed a difference value calculated for an earlier candidate macroblock of the search space.

Figure 11:
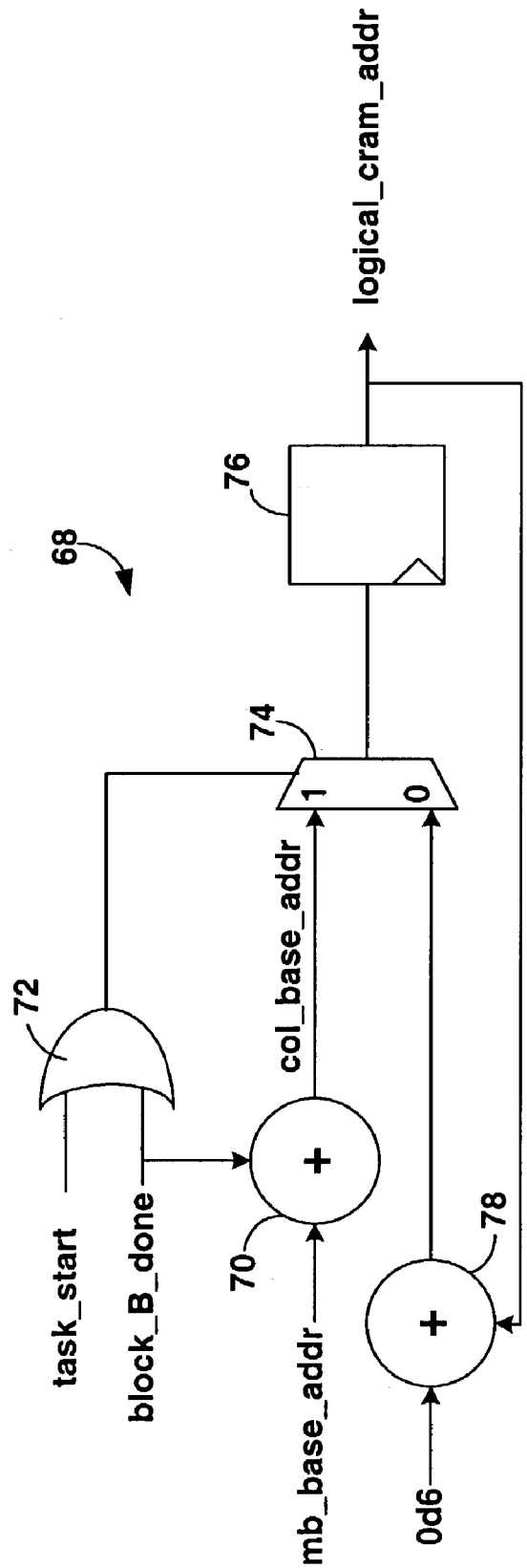
FIG. 11 is a block diagram illustrating physical address mapping for a memory bank in candidate memory.

FIG. 11 is a block diagram illustrating physical address mapping circuitry 68 for a memory bank in candidate memory 38. Generation of a physical address within candidate memory 38 involves loading an accumulator with the base address generated by the pixel index to address translation shown in FIG. 9. With each clock cycle, the address is incremented by 48 pixels, to the next line of pixels in the macroblock, which translates to 6 rows (48 pixels÷8 banks). Upon completion of block B, the accumulator reloads base address+1 for block C and block D computation.

As shown in FIG. 11, mapping circuitry 68 may include an adder 70 that adds a 1 to the base address (mb_base_addr) when computation for block B is done (block_b_done), thereby producing the column base address (col_base_addr) within candidate memory 38. An OR gate 72 passes a logical high output to multiplexer 74 if either block B is done or the search task is started (task_start).

In response to a logical high output from OR gate 72, multiplexer 74 outputs the column base address to an accumulator 76. In response to logical low output from OR gate 72, multiplexer passes the output of adder 78 to accumulator 76. Adder 78 adds the present candidate memory address (logical_cram_addr) from accumulator 76 to a value of 6. If there is neither the start of a search task or completion of block B, multiplexer 74 and accumulator 78 advance the present candidate memory address by six rows, i.e., 48 pixels over 8 banks. In this manner, memory control unit 39 cycles through each row of 8 banks in candidate memory 38 for presentation to difference processor 34 one microblock row at a time, subject to either completion of block B or the start of a new search task. Accordingly, computations are performed in a row by row manner until each difference value for a microblock is generated, and on a microblock-by-microblock manner until a difference value for a macroblock is computed. The process then continues in another row-by-row, microblock-by-microblock manner for the next macroblock of the search space, and so forth.

Figure 12:
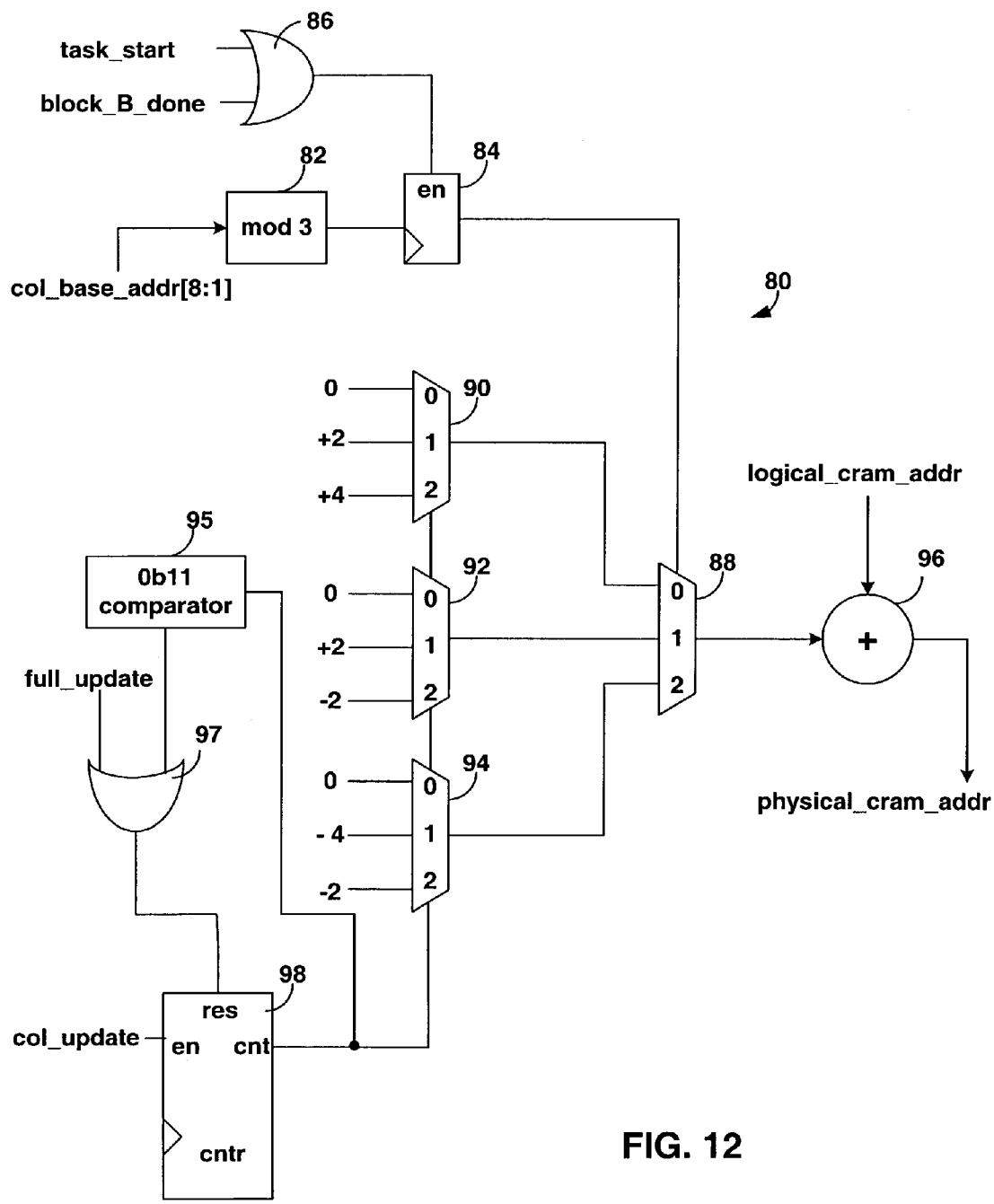
FIG. 12 is a block diagram illustrating physical address mapping for a macroblock column update in candidate memory.

FIG. 12 is a block diagram illustrating physical address mapping circuitry 80 for a macroblock column update in candidate memory. Address mapping circuitry 68, shown in FIG. 11, does not handle the macroblock column shift when a macroblock column update occurs. Rather, mapping circuitry 68 is applicable to the macroblock columns in a fully reloaded search space. When the column update feature is applied, address mapping circuitry 80 of FIG. 12 provides another level of address mapping.

In the physical candidate memory 38, each row in a macroblock column is mapped to two rows of data. For example, upon reset, address 0 and address 1 (addr 0/1) represent the first row of the left macroblock column. In particular address 0 represents the 8 bank row in candidate memory 38 that corresponds to the first 8 pixels in the pixel index row for the left macroblock column. Address 1 represents the 8 bank row in candidate memory 38 that corresponds to the second 8 pixels in the pixel index row for the left macroblock column.

Address 2 and address 3 (addr 2/3) then represent the first row of the middle macroblock column, and address 4 and address 5 (addr 4/5) represent the first row of the right macroblock column. Thus, as shown in FIG. 7C, the 8-bank rows of candidate memory 38 sequentially store the pixel data each entire row (e.g., Y0-Y47 for the first row) spanning the left, middle and right macroblock columns.

After one macroblock column update, addr 0/1 (which previously represented the left macroblock column) is used to represent the right macroblock column, addr 2/3 (previously the middle macroblock column) represents the left macroblock column, and addr 4/5 (previously the right macroblock column) represents the middle macroblock column.

In this manner, the left and right macroblock columns store the same data as the previous middle and right macroblock columns, respectively, and do not need to be reloaded with new data. However, the addresses (addr 2/3 and addr 4/5) are now mapped to the left and middle macroblock columns. The previous left macroblock column address (addr 0/1), however, is remapped to the right macroblock column and reloaded with new data from video memory 32.

To carry out the address mapping for the column update mode, mapping circuitry 80 in FIG. 12 determines two conditions: a mod 3 output for the candidate memory column base address (col_base_addr mod 3) and the macroblock column shift status, i.e., whether a full update or column update is requested.

As shown in FIG. 12, mapping circuitry 80 includes a mod 3 operator 82 that produces the mod 3 output of the present base column address divided by 2 (cram_addr[8:1]), and applies the mod 3 output to a temporary storage device 84 (sometimes referred to as a flip flop). The mod 3 output will always be a 0, 1, or 2 for the column base address. For example, the column base address (Y0) for the first column will yield a 0, the column base address (Y16) for the second column will yield a 1, and the column base address (Y32) for the third column will yield a 2.

When a new search task is started (task_start) or computation for block B is done (block_b_done), an OR gate 86 enables flip flop 84 to output the mod 3 output from mod 3 operator 82 for application to a multiplexer 88. The mod 3 output indicates the column in which the column base address presently resides, i.e., the first column (0), second column (1) or third column (2).

In response, multiplexer 88 passes one of the outputs of multiplexers 90, 92, 94 to an adder 96. The outputs of multiplexers 90, 92, 94 are determined by the output of 2-bit counter 98. Counter 98 resets with the value of 0 in response to receipt of a full_update signal, indicating that the entire search space in candidate memory 38 will be reloaded. In response to a col_update signal at the enable input, counter 98 counts one increment (or may count downward for other implementations).

The col_update signal indicates that the search space in candidate memory 38 will be incrementally updated by loading one new column. Counter 98 may increment for each column update, or may increment for 2 column updates, and return to a value of 0 following a third column update. For example, counter 98 may increment from 0, to 1, to 2, back to 0, to 1, to 2, to 0, to 1 to 2, and so forth. Counter 98 may also get reset when count equals to 0x11, and this reset may occur regardless of enable state.

In any case, the count output of counter 98 tracks how many column shifts have been performed during the course of the incremental column update routine. The count output of counter 98 may provide logical input to multiplexers 90, 92, 94 to facilitate address mapping decisions. Multiplexers 90, 92, 94 correspond to the left, middle and right columns, respectively, of the search space. If the count output is a 0, multiplexers 90, 92, 94, output values 0, 0, and 0. If the count output is a 1, multiplexers 90, 92, 94, output +2, +2 and −4, respectively. If the count output is 2, multiplexers 90, 92, 94, output 0, −4, and +2, respectively. In addition, the count output is provided to 0b11 comparator 95 which provides a signal to OR gate 97. Thus, reset of counter 98 can occur in response to either full_update signal or a signal from comparator 95, both of which are inputs to OR gate 97.

This operation of multipexers 90, 92, 94 reflect the shifting of the previous middle column to the left column and the shifting of the previous right column to the middle column, i.e., two rows (+2) to the left in each case. Recall that each row in a macroblock column is represented by two rows in candidate memory 38 (See FIG. 7C). This operation also reflects the shifting of the previous left column to the right column, i.e., four rows (−4) to the left. After three column updates, the addresses once again match the physical memory, so the output values of multiplexers 90, 92 and 94 return to 0, 0, and 0 respectively.

The outputs of multiplexers 90, 92 and 94 reflect the next shift in the sequence. After the second shift, the original middle column has already been shifted to the left column and is now shifted to the right column, the original right column is now shifted to the left column, and the original left column is now shifted to the middle column. In this case, the present left column is +4 rows away from its original position in the right column, the present middle column is −2 rows away from its original position in the left column, and the present right column is −2 rows away from its original position in the middle column.

If the output of flip-flip 84 is zero, the output of the first column multiplexer 90 is passed through multiplexer 88. If the output of flip-flip 84 is 1 or 2, the output of the second or third column multiplexer 92, 94, respectively, is passed through multiplexer 88. In each case, the output of multiplexer 88 is applied to adder 96, which adds the output to the logical candidate memory address (logical_cram_addr).

In this manner, adder 96 shifts the logical candidate memory address by an amount commensurate with the column update shift status in order to obtain the physical candidate memory address for the appropriate macroblock. If the logical address corresponds to the right column as a result of shift operations, but the physical address actually corresponds to the middle column, mapping circuitry 80 provides the necessary address translation. Memory control unit 39 then causes difference processor 34 to compare the properly addressed data in candidate memory 38 to corresponding data in encode memory 36, e.g., for the parallel AD computation across the 8 output banks.

Figure 13:
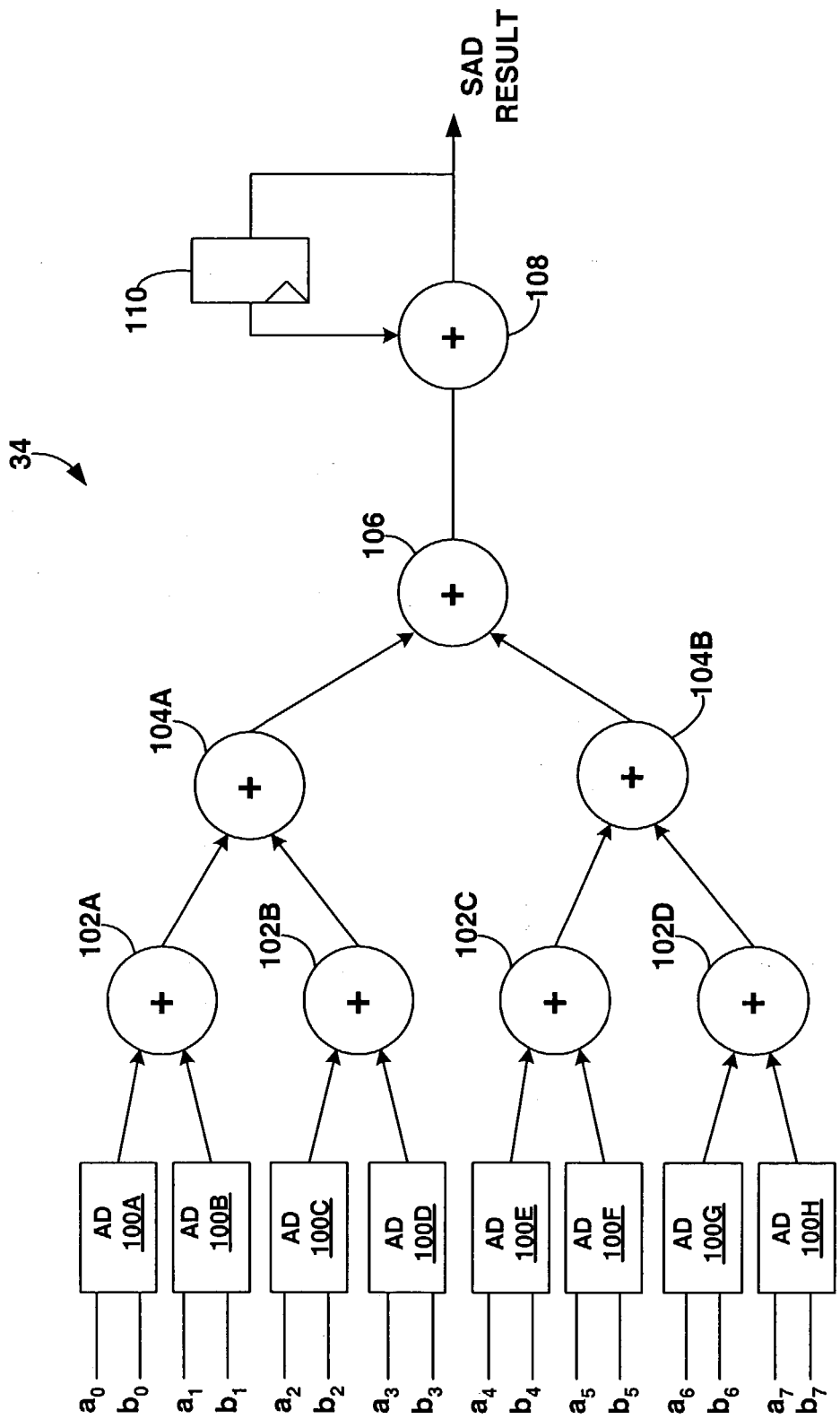
FIG. 13 is a block diagram illustrating a difference processor.

FIG. 13 is a block diagram illustrating difference processor 34 in greater detail. In particular, FIG. 13 depicts the parallel computation capabilities provided by the arrangement of encode memory 36 and candidate memory 38 to produce 8 simultaneous bank outputs. As shown in FIG. 13, difference processor may include multiple absolute different (AD) calculation channels 100A-100H (together 100). Each AD calculation channel 100 receives a respective bank output (a0-a7) from encode memory 36 for a macroblock to be encoded.

For comparison, and calculation of absolute difference, each AD calculation channel 100 also receives corresponding bank outputs (b0-b7) from candidate memory 38. The AD results are summed by a set of 8-bit adders 102A-102D, a pair of 9-bit adders 104A, 104B and a 10-bit adder 106 in a cascading fashion. Larger adders may be implemented if larger-bit values are used to represent the pixels. In any case, the output of adder 106 is applied to an adder 108. Adder 108 sums its own output, via flip-flop 110, with the output of adder 106 to produce the sum of absolute differences (SAD) result. Each set of eight inputs (a0-a7) may correspond to an eight pixel row of a microblock. For example, input may be provided to difference processor for each row of microblock A (FIG. 6A), then each row of microblock B, then microblock C, then microblock D. The accumulation can be latched after computing the difference metric for each microblock, and then latched again for the total accumulation corresponding to the difference metric for the macroblock.

Moreover, after each respective latch a determination of whether to terminate a task can be made. In other words, each latch of a microblock row may provide an opportune time to determine whether the task threshold has been exceeded. If so, the additional computations for that particular task can be terminated because it is known that that search will not yield the lowest difference value.

Figure 14:
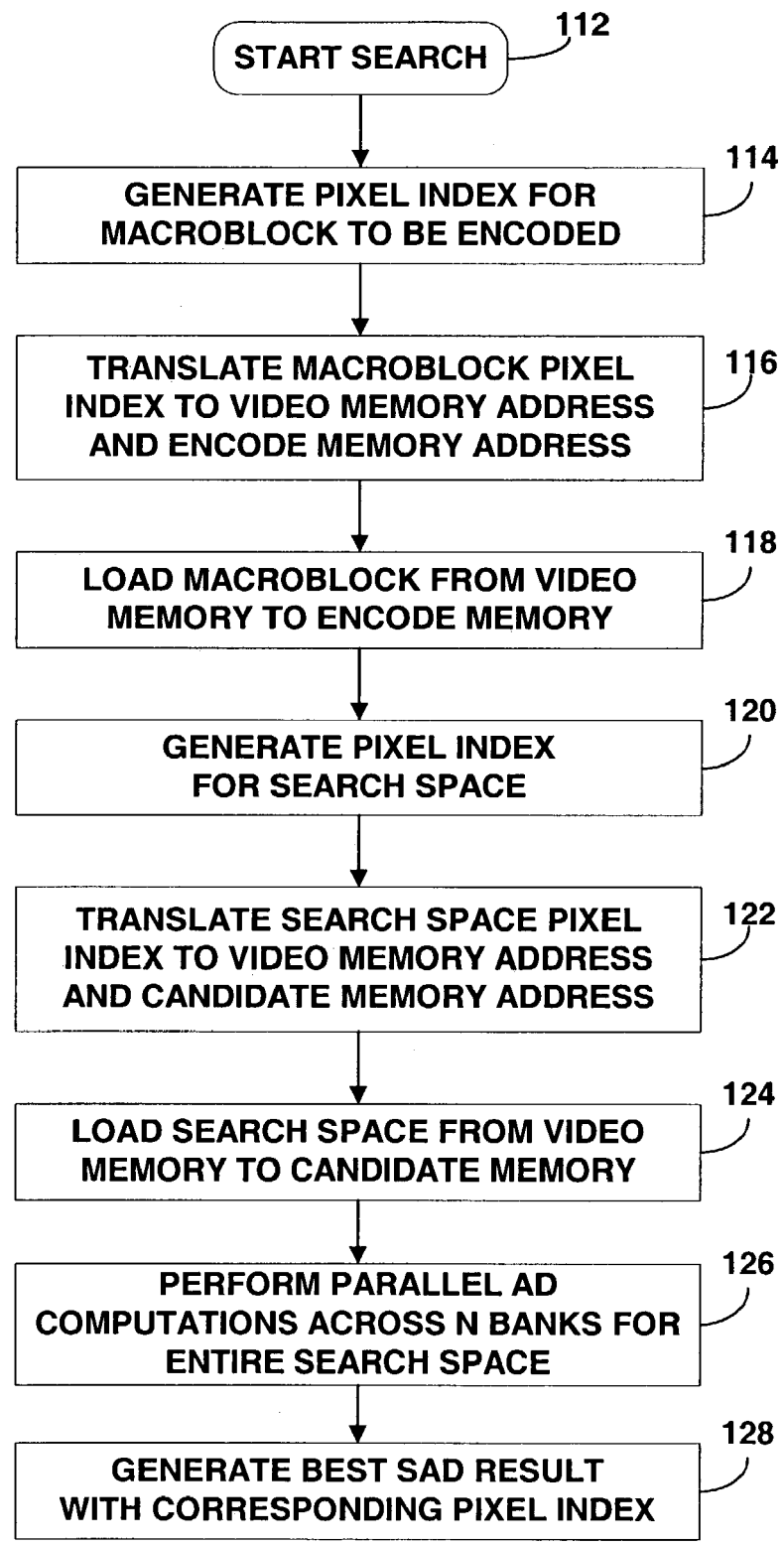
FIG. 14 is a flow diagram illustrating a video encoding technique.

FIG. 14 is a flow diagram illustrating a video encoding technique as described herein. As shown in FIG. 14, upon the start of a search, i.e., the start of a task (112), DSP 28 generates a pixel index of the macroblock to be encoded (114). Memory control unit 39 translates the macroblock pixel index into a video memory address and encode memory address (116), and the macroblock is loaded from video memory 32 to encode memory 36 via bus 33 and the memory control unit (118). DSP 28 also generates a pixel index for the search space (120). Upon translating the search space pixel index to video memory address and a candidate memory address (122), memory control unit 39 loads candidate memory 38 with the search space macroblocks (124).

Difference processor 34 performs parallel AD computations (126) between the multiple bank outputs of candidate memory 38 and encode memory 36 to compare the macroblock to be encoded to macroblocks within the search space. On the basis of the parallel AD computations, difference processor 34 generates the best SAD result across the entire search space (128) (or possibly generates an acceptable result without considering the full search space). In either case, the result is associated with the pixel index for the macroblock to be encoded. As mentioned, difference processor 34 may also generate a SAD results for each microblock that forms the macroblock without requiring additional SAD computations. After generating the SAD result for the macroblock, DSP 28 can determine whether an acceptable match was identified, and if so can store a motion vector to identify the macroblock to be encoded according to for MPEG-4 compression standards.

Figure 15:
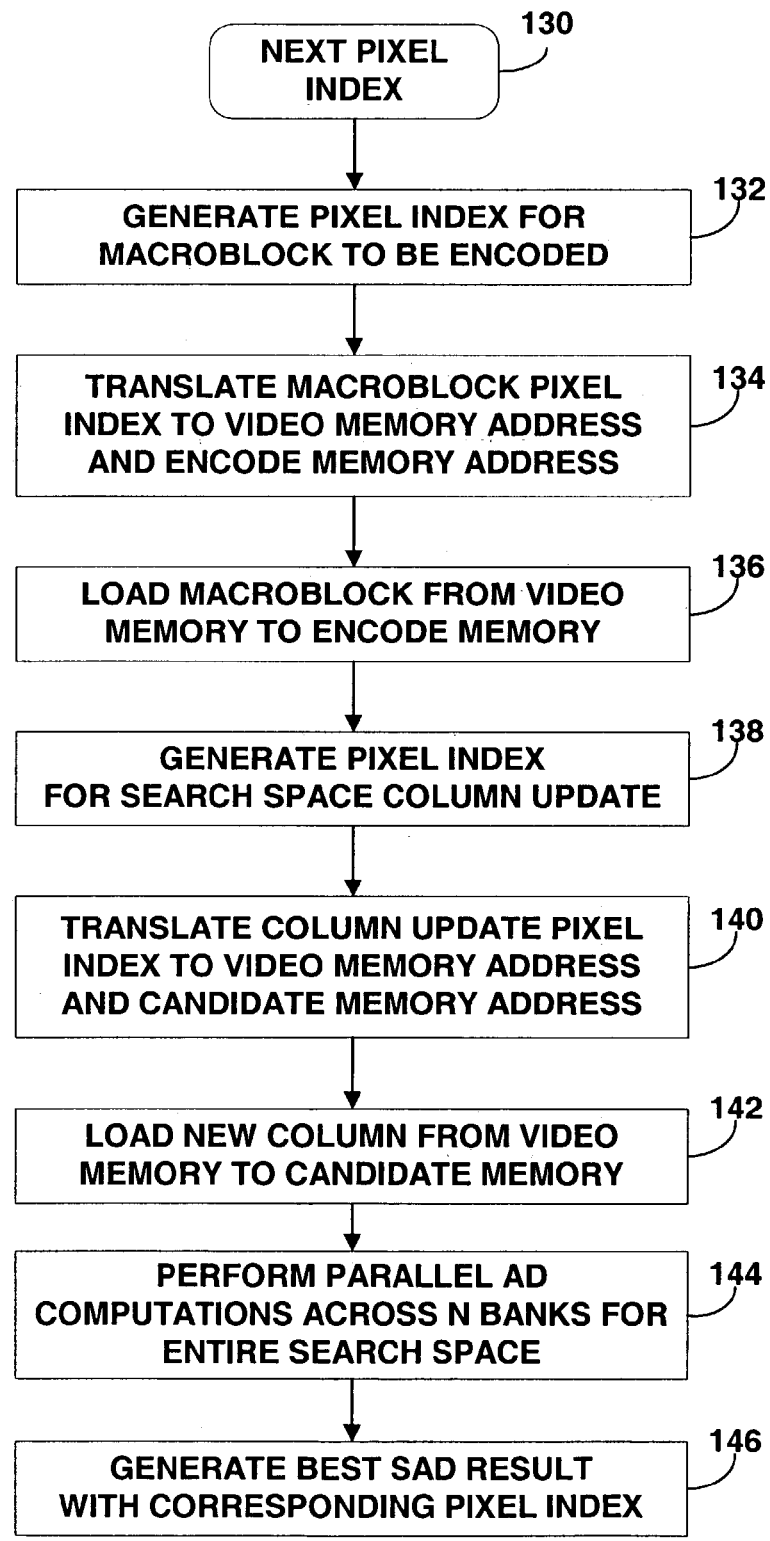
FIG. 15 is a flow diagram illustrating a video encoding technique using column updates to incrementally load the search space.

FIG. 15 is a flow diagram illustrating a video encoding technique using column updates to incrementally load the search space. Upon generation of the next pixel index (130, 132) by DSP 28 to drive another search task, memory control units 39 translates the macroblock pixel index to a video memory address and encode memory address (134). The pertinent macroblock is then loaded from video memory 32 to encode memory 36 (136). In this case, however, the search space is incrementally updated by adding a new column rather than reloading the entire search space.

Accordingly, DSP 28 generates a pixel index for the search space column update (138), which is then translated by memory control unit 39 to produce a pertinent video memory address and candidate memory address (140). Upon loading a new macroblock column from video memory 32 to candidate memory 38 (142), difference processor 34 performs the parallel AD computations across the 8 output banks of candidate memory 38 and encode memory 36 (144), and generates the best SAD result (or an acceptable SAD result) after a number of parallel AD computations (146).

Figure 16:
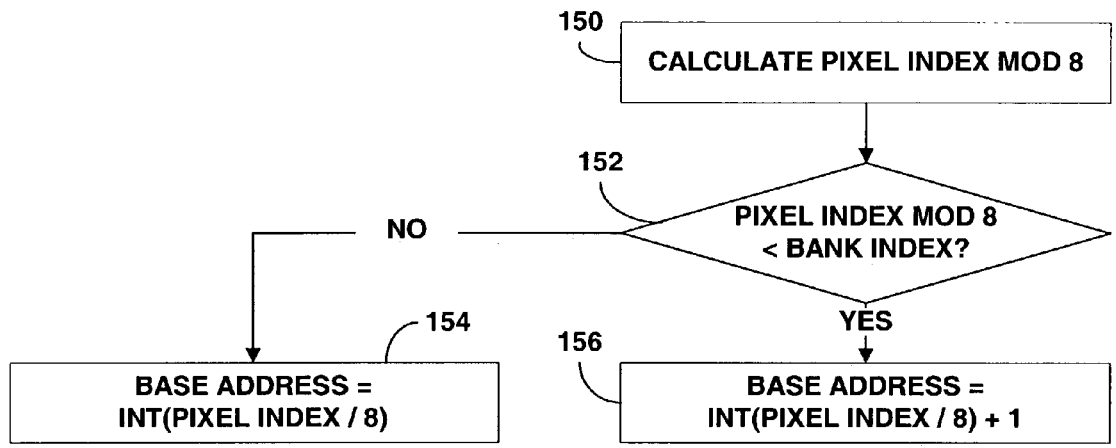
FIG. 16 is a flow diagram illustrating base address mapping for a memory bank in candidate memory.

FIG. 16 is a flow diagram illustrating base address mapping for a memory bank in candidate memory. The process shown in FIG. 16 corresponds to the operation of the circuit in FIG. 9, although other variations of the circuit could be used. To obtain a base address from the pixel index, memory control unit 39 calculates the result of a mod 8 operation on the pixel index (150). If the result is greater than or equal to the current bank index (152), the base address is equal to the integer quotient of the pixel index divided by 8 (154). If the result is less than the current bank index (152), the base address is equal to the integer quotient of the pixel index divided by 8 plus 1 (156).

Figure 17:
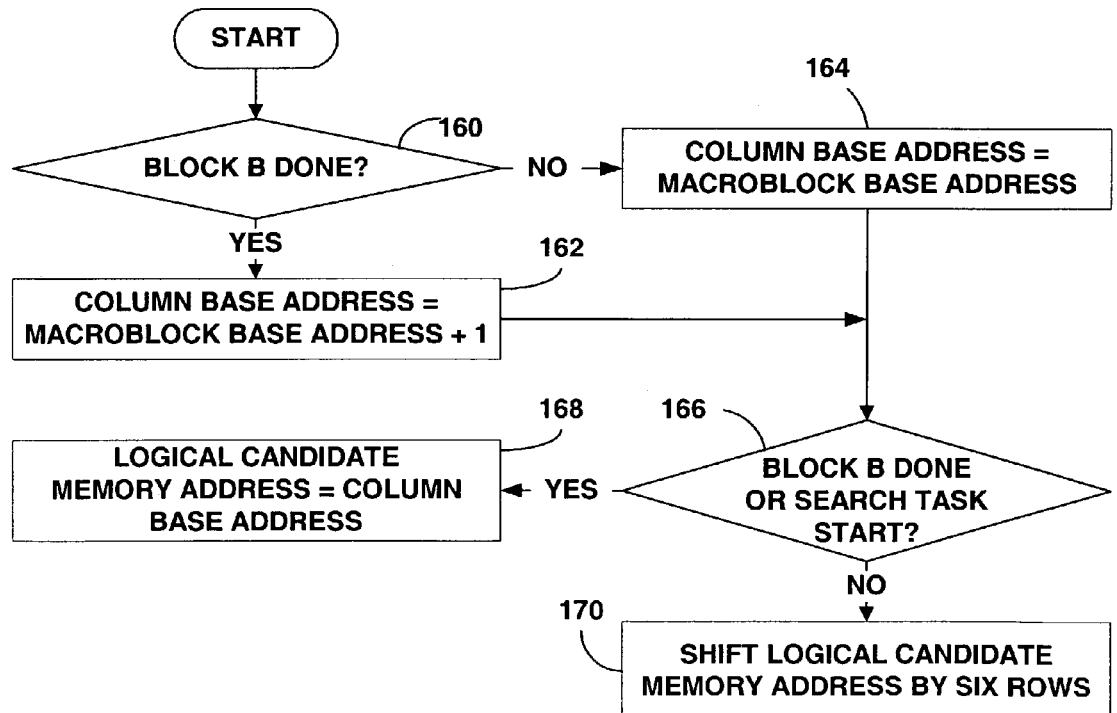
FIG. 17 is a flow diagram illustrating physical address mapping for a memory bank in candidate memory.

FIG. 17 is a flow diagram illustrating physical address mapping for a memory bank in candidate memory. The process shown in FIG. 17 corresponds to the operation of circuit 68 in FIG. 11, although other variations of the circuit could be used. If AD computation for block B within a macroblock has been completed (160), the column base address in candidate memory 38 is equal to the macroblock base address plus 1 (162). If block B is not done (160), the column base address in candidate memory 38 is equal to the macroblock base address (164). Then, if either block B is done or a new search task is started (166), the logical memory address in candidate memory 38 is equal to the column base address (168). If neither block B is done nor a new search is started (166), the logical candidate memory address is shifted by six rows (170).

Figure 18:
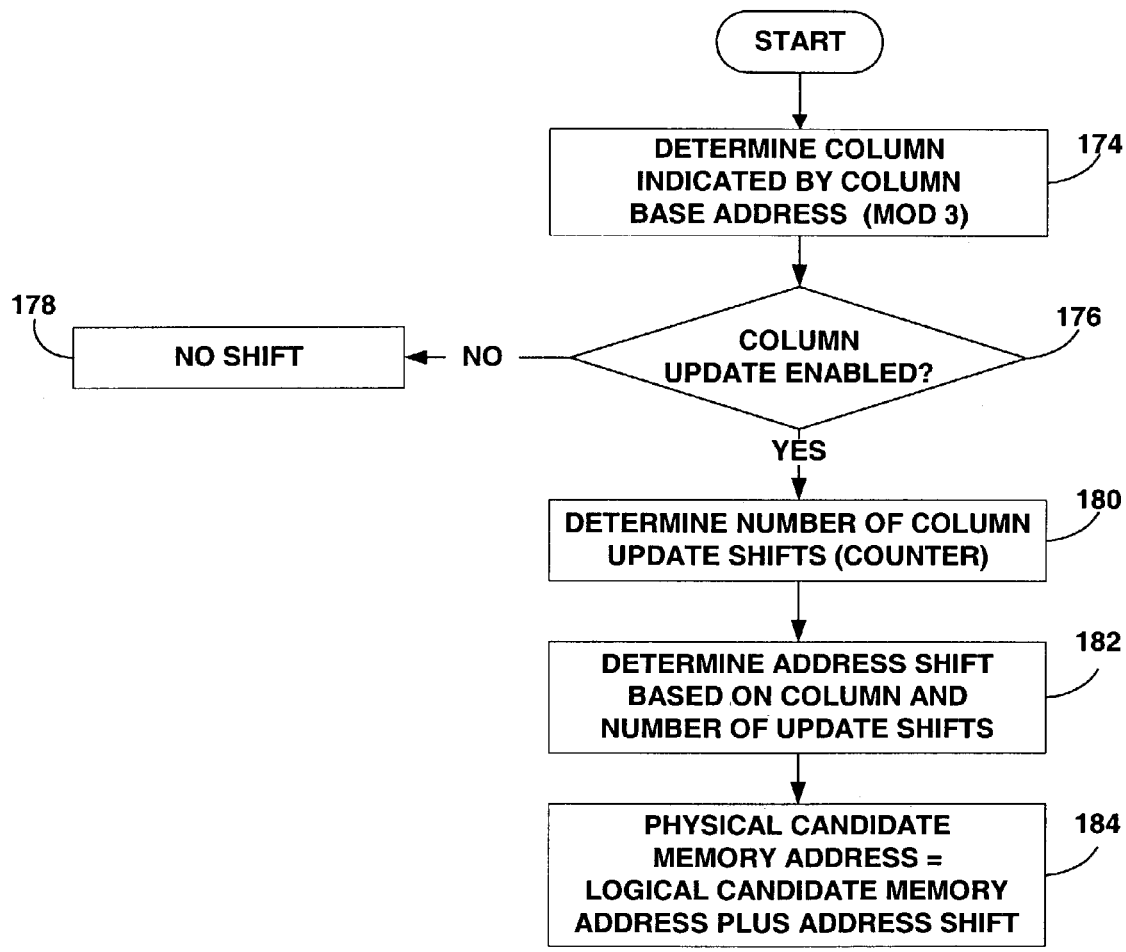
FIG. 18 is a flow diagram illustrating physical address mapping for a macroblock column update in candidate memory.

FIG. 18 is a flow diagram illustrating physical address mapping for a macroblock column update in candidate memory. The process shown in FIG. 18 corresponds to the operation of circuit 80 in FIG. 12, although other variations of the circuit could be used. As shown in FIG. 18, to determine the column indicated by the column base address, memory control unit 39 applies a mod 3 operation to the column base address (174). If the column update feature is not enabled (176), the logical candidate memory address is not shifted (178). This corresponds to an output of (0, 0, 0) from multiplexers 90, 92, 94, in FIG. 12, corresponding to a counter output of 0 from counter 98, and hence passage of a 0 by multiplexer 88.

If column update is enabled (176), memory control unit 39 determines the number of column update shifts that have occurred by reference to the output of counter 98 (180). Based on the identified column and the number of column update shifts, memory control unit 39 determines the amount by which the logical candidate memory address should be shifted to produce the correct physical candidate memory address (182). Memory control unit 39 then translates the logical candidate memory address to the physical candidate memory address by applying the address shift (184).

Figure 19:
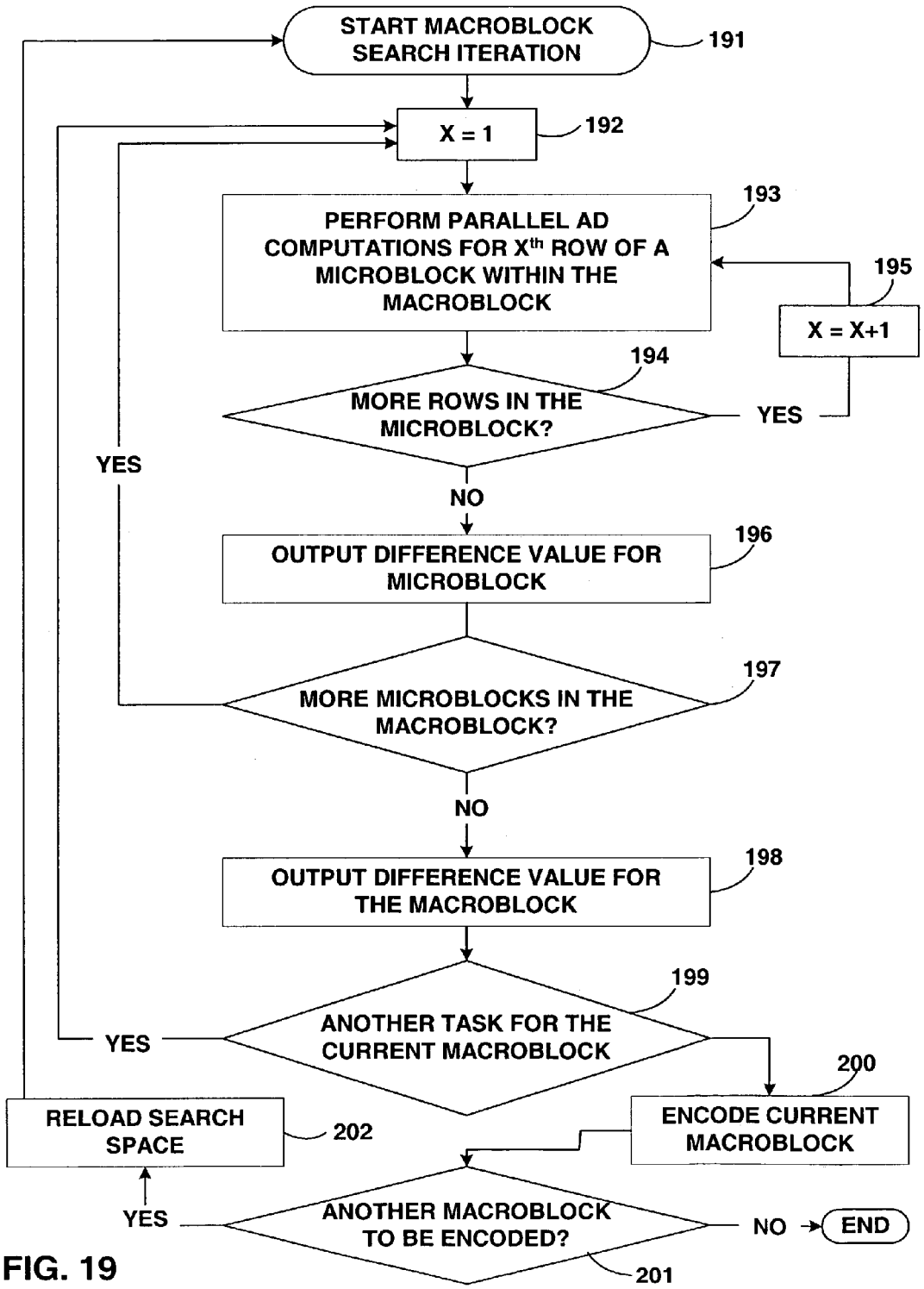
FIG. 19 is a flow diagram illustrating the generation of difference values for a macroblock and a number of microblocks that form the macroblock using the same computations.

FIG. 19 is a flow diagram illustrating the generation of difference values for a macroblock and a number of microblocks that form the macroblock using the same computations. As shown, when motion estimator 29 begins a macroblock search iteration (191), difference processor 34 performs parallel absolute difference (AD) computations on a microblock-row by microblock-row basis. For example, the value X can be initialized (192), and difference processor 34 can perform parallel AD computations on the Xth row of the first microblock within the macroblock being encoded (193). As long as there are more rows in the microblock (yes branch of 194), the value X is incremented (195), and parallel AD computations are performed on the next row of the microblock.

Video block counter circuitry 62 can determine whether there are more rows in the microblock (194). By way of example, video block counter circuitry 62 can be integrated as part of difference processor 34 or may form part of DSP interface unit 30. Upon determining that the AD computations have been performed for every row of the first microblock, difference processor 34 outputs a difference value for the first microblock (196). This process can continue for every microblock of the macroblock until there are no more microblocks (197). Task termination techniques may also be employed at this stage of the process, for example, to terminate a task when the overall accumulated difference value exceeds a task threshold, such as a threshold corresponding to the lowest difference value already calculated for the current iteration.

Difference processor 34 can accumulate an ongoing difference value for the macroblock, and may output difference values for each microblock, as the computations for each microblock are performed. The difference value for the first microblock may be the accumulation of difference values up to that point. The difference value for the second microblock may correspond to the total accumulation up to that point minus the difference value for the first microblock. The difference value for the third microblock may correspond to the total accumulation up to that point minus the difference values for the first and second microblocks, and so forth.

Video block counter circuitry 62 also determines when the computations for the last microblock have been accumulated (yes branch of 197). At that point, difference processor 34 outputs the difference value for the macroblock (198), which is the total accumulation of AD computations up to that point. DSP 28, or possibly DSP interface unit 30, can determine whether there is another task to be performed for the current macroblock to be encoded there are more rows in the microblock (194). Again, a task refers to a set of computations used to compare a current video block to be encoded to a video block in the search space, and an iteration refers to a set of tasks corresponding to the comparison of various different video blocks of the search space to the current video block to be encoded.

An iteration may be as simple as comparing a defined set of video blocks of a search space to the video block to be encoded, or may be much more complex to include initialization techniques that locate a position within a search space, nested searches, and/or defined and redefined search parameters to locate the best match as quickly as possible. In any case, after motion estimator 29 has performed all of the tasks for the iteration (no branch of 199), video encoder 18 encodes the current macroblock (200). Advantageously, video encoder may have various options in the encoding process when difference values for various candidate macroblocks of the search space are generated and difference values for the microblocks that form the candidates are also generated.

The use of four separate motion vectors corresponding to the best candidate microblocks, may be used to encode the macroblock for improved compression. The use of a single motion vector corresponding to the best candidate macroblock may be preferred for other reasons, however, such as for maintaining compliance with decoders that only recognize macroblock motion vectors. Texture encoding may also be added, such as by performing discrete cosign transform (DCT) encoding on a matrix that defines the differences between the current macroblock to be encoded and the video block(s) defined by the motion vector(s).

After the current macroblock has been encoded, video encoder 18 may determine whether there is another macroblock to be encoded for the current video frame, i.e., whether there is another iteration to be performed (201). If not, the encoding process for the given video frame is complete (no branch of 201), and the encoded video blocks for the frame can be transmitted by transmitter 20 over communication medium 15 (FIG. 1). However, if there is another macroblock to be encoded for the current video frame, the search space can be reloaded (202), and the next iteration can begin (191). Moreover, the process of reloading the search space (202) may utilize the column update techniques outlined above, in which memory control unit reloads a subset of columns of the candidate memory 38 and keeps track of the candidate memory via an addressing scheme such as outlined herein. These and other techniques outlined herein, whether used stand-alone techniques to improve various conventional encoding processes, or when used in combination, may improve the efficiency of video encoding according to standards such as MPEG-4, and better facilitate the implementation of video encoding within wireless communication devices, such as mobile telephones, in which computational resources are more limited and power consumption is a concern.

A number of different embodiments have been described. The techniques may be capable of improving video encoding by reducing memory transfers, computation cycles, and power consumption, thereby accelerating the encoding process and possibly extending the longevity of battery-powered video devices. In addition, the techniques may provide options in the encoding process by generating difference values for macroblocks and microblocks without requiring additional AD computations. In these and possibly other ways, the techniques can improve video encoding according to standards such as MPEG-4 or other video encoding standards.

The techniques may be implemented in hardware, software, firmware, or any combination thereof. If implemented in software, the techniques may be directed to a computer readable medium comprising program code, that when executed in a device that encodes video sequences compliant with an MPEG-4 standard, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components such as a motion estimator to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

The invention claimed is:
1. A method of encoding video, comprising the steps of:
loading a set of pixel values into memory to define a first search space, the first search space defining a first plurality of columns of candidate video blocks to be com- pared to a first video block to be encoded during a first iteration of a motion estimation routine;

performing the first iteration to compare the first video block to the candidate video blocks in the first search space, wherein performing the first iteration includes performing in parallel a plurality of difference computations between pixel values of the first video block to be encoded and pixel values of one of the candidate video blocks in the first search space, wherein the first video block comprises a macroblock that includes a plurality of microblocks, wherein the plurality of difference computations performed in parallel correspond to a row of one of the microblocks, wherein the microblocks include a plurality of rows, wherein performing the first iteration further includes generating a set of microblock difference values based on the computations, the microblock difference values respectively being indicative of differences between each of a plurality of microblocks that form the macroblock to be encoded and microblocks that form the candidate macroblock, and generating a macroblock difference value based on the computations, the macroblock difference value being indicative of a difference between the macroblock to be encoded and the candidate macroblock, wherein the macroblock difference value comprises a summation of the plurality of microblock difference values; and reloading a subset of the columns of candidate video blocks to define a second search space, the second search space defining a second plurality of columns of candidate video blocks to be compared to a second video block to be encoded during a second iteration of the motion estimation routine.

2. The method of claim 1, wherein reloading the subset of the columns of candidate video blocks includes mapping a set of logical memory addresses to a set of physical memory addresses.

3. The method of claim 2, wherein reloading the subset of the columns of candidate video blocks includes reordering the second plurality of columns of the second search space relative to the first plurality of columns of the first search space based on the mapping.

4. The method of claim 1, further comprising performing the second iteration to compare the second video block to the candidate video blocks in the second search space, wherein performing the second iteration includes performing in parallel a second plurality of difference computations between pixel values of the second video block to be encoded and pixel values of one of the candidate video blocks in the second search space, wherein the second video block comprises a second macroblock that includes a second plurality of microblocks, wherein the second plurality of difference computations performed in parallel during the second iteration correspond to a row of one of the microblocks of the second macroblock.

5. The method of claim 4, further comprising:
reloading another subset of the columns to define a third search space, the third search space defining a third plurality of columns of candidate video blocks to be compared to a third video block to be encoded during a third iteration of the motion estimation routine; and
performing the third iteration to compare the third video block to the candidate video blocks in the third search space.

6. The method of claim 5, further comprising:
reloading another subset of the columns to define a fourth search space, the fourth search space defining a fourth plurality of columns of candidate video blocks to be compared to a fourth video block to be encoded during a fourth iteration of the motion estimation routine; and
performing the fourth iteration to compare the fourth video block to the candidate video blocks in the fourth search space.

7. A device for encoding video, comprising:
an encoder that encodes video frames according to a motion estimation routine, the encoder being configured to load a set of pixel values into memory to define a first search space, the first search space defining a first plurality of columns of candidate video blocks to be compared to a first video block to be encoded during a first iteration of the motion estimation routine, perform the first iteration to compare the first video block to the candidate video blocks in the first search space, wherein performing the first iteration includes performing in parallel a plurality of difference computations between pixel values of the first video block to be encoded and pixel values of one of the candidate video blocks in the first search space, wherein the first video block comprises a macroblock that includes a plurality of microblocks, wherein the plurality of difference computations performed in parallel correspond to a row of one of the microblocks, wherein the microblocks include a plurality of rows, wherein performing the first iteration further includes generating a set of microblock difference values based on the computations, the microblock difference values respectively being indicative of differences between each of a plurality of microblocks that form the macroblock to be encoded and microblocks that form the candidate macroblock, and generating a macroblock difference value based on the computations, the macroblock difference value being indicative of a difference between the macroblock to be encoded and the candidate macroblock, wherein the macroblock difference value comprises a summation of the plurality of microblock difference values, and reload a subset of the columns of candidate video blocks to define a second search space, the second search space defining a second plurality of columns of candidate video blocks to be compared to a second video block to be encoded during a second iteration of the motion estimation routine; and
a transmitter that transmits the encoded video frames.

8. The device of claim 7, wherein the encoder maps a set of logical memory addresses to a set of physical memory addresses when reloading the subset of the columns of candidate video blocks.

9. The device of claim 8, wherein the encoder reorders the second plurality of columns of the second search space relative to the first plurality of columns of the first search space based on the mapping.

10. The device of claim 7, wherein the encoder is further configured to perform the second iteration to compare the second video block to be encoded to the candidate video blocks in the second search space, wherein performing the second iteration includes performing in parallel a second plurality of difference computations between pixel values of the second video block to be encoded and pixel values of one of the candidate video blocks in the second search space, wherein the second video block comprises a second macroblock that includes a second plurality of microblocks, wherein the second plurality of difference computations performed in parallel during the second iteration correspond to a row of one of the microblocks of the second macroblock.

11. The device of claim 10, wherein the encoder is further configured to reload another subset of the columns to define a third search space, the third search space defining a third plurality of columns of candidate video blocks to be compared to a third video block to be encoded during a third iteration of the motion estimation routine, and perform the third iteration to compare the third video block to the candidate video blocks in the third search space.

12. The device of claim 11, wherein the encoder is further configured to reload another subset of the columns to define a fourth search space, the fourth search space defining a fourth plurality of columns of candidate video blocks to be compared to a fourth video block to be encoded during a fourth iteration of the motion estimation routine, and perform the fourth iteration to compare the fourth video block to the candidate video blocks in the fourth search space.

13. The device of claim 7, wherein the device is selected from the group consisting of: a digital television, a wireless communication devices, a personal digital assistant, a laptop computer, a desktop computer, a digital camera, a digital recording device, a cellular radiotelephone having video capabilities, and a satellite radiotelephone having video capabilities.

14. The device of claim 7, further comprising a video capture device to capture video frames in real-time, the encoder being configured to encode the video frames in real-time and the transmitter being configured to transmit the encoded video frames in real-time.

15. An apparatus for encoding video, comprising:
a memory;
a memory control unit that loads a set of pixel values into the memory to define a first search space, the first search space defining a first plurality of columns of candidate video blocks to be compared to a first video block to be encoded during a first iteration of a motion estimation routine, and reloads a subset of the columns of candidate video blocks to define a second search space, the second search space defining a second plurality of columns of candidate video blocks to be compared to a second video block to be encoded during a second iteration of the motion estimation routine; and
a processor that performs the first iteration to compare the first video block to the candidate video blocks in the first search space and performs the second iteration to compare the second video block to the candidate video blocks in the second search space,
wherein performing the first iteration includes performing in parallel a plurality of difference computations between pixel values of the first video block to be encoded and pixel values of one of the candidate video blocks in the first search space, wherein the first video block comprises a macroblock that includes a plurality of microblocks, wherein the plurality of difference computations performed in parallel correspond to a row of one of the microblocks, wherein the microblocks include a plurality of rows, wherein performing the first iteration further includes generating a set of microblock difference values based on the computations, the microblock difference values respectively being indicative of differences between each of a plurality of microblocks that form the macroblock to be encoded and microblocks that form the candidate macroblock, and generating a macroblock difference value based on the computations, the macroblock difference value being indicative of a difference between the macroblock to be encoded and the candidate macroblock, wherein the macroblock difference value comprises a summation of the plurality of microblock difference values,
wherein performing the second iteration includes performing in parallel a second plurality of difference computations between pixel values of the second video block to be encoded and pixel values of one of the candidate video blocks in the second search space, wherein the second video block comprises a second macroblock that includes a second plurality of microblocks, wherein the second plurality of difference computations performed in parallel during the second iteration correspond to a row of one of the microblocks of the second macroblock.

16. The apparatus of claim 15, wherein the memory control unit maps a set of logical memory addresses to a set of physical memory addresses when reloading the subset of the columns of candidate video blocks.

17. The apparatus of claim 16, wherein the memory control unit reorders the second plurality of columns of the second search space relative to the first plurality of columns of the first search space based on the mapping.

18. The apparatus of claim 15, wherein the memory control unit reloads another subset of the columns to define a third search space, the third search space defining a third plurality of columns of candidate video blocks to be compared to a third video block to be encoded during a third iteration of the motion estimation routine; and
the processor performs the third iteration to compare the third video block to the candidate video blocks in the third search space.

19. The apparatus of claim 18, wherein the memory control unit reloads another subset of the columns to define a fourth search space, the fourth search space defining a fourth plurality of columns of candidate video blocks to be compared to a fourth video block to be encoded during a fourth iteration of the motion estimation routine, and
the processor performs the fourth iteration to compare the fourth video block to the candidate video blocks in the fourth search space.

20. An apparatus that encodes video blocks according to a video coding standard, the apparatus comprising:
means for loading a set of pixel values into memory to define a first search space, the first search space defining a first plurality of columns of candidate video blocks to be compared to a first video block to be encoded during a first iteration of a motion estimation routine;
means for performing the first iteration to compare the first video block to the candidate video blocks in the first search space, wherein the means for performing the first iteration includes means for performing in parallel a plurality of difference computations between pixel values of the first video block to be encoded and pixel values of one of the candidate video blocks in the first search space, wherein the first video block comprises a macroblock that includes a plurality of microblocks, wherein the plurality of difference computations performed in parallel correspond to a row of one of the microblocks, wherein the microblocks include a plurality of rows, wherein means for performing the first iteration further includes means for generating a set of microblock difference values based on the computations, the microblock difference values respectively being indicative of differences between each of a plurality of microblocks that form the macroblock to be encoded and microblocks that form the candidate macroblock, and means for generating a macroblock difference value based on the computations, the macroblock difference value being indicative of a difference between the macroblock to be encoded and the candidate macroblock, wherein the macroblock difference value comprises a summation of the plurality of microblock difference values; and means for reloading a subset of the columns of candidate video blocks to define a second search space, the second search space defining a second plurality of columns of candidate video blocks to be compared to a second video block to be encoded during a second iteration of the motion estimation routine.

21. The apparatus of claim 20, wherein the apparatus maps a set of logical memory addresses to a set of physical memory addresses when reloading the subset of the columns of candidate video blocks.

22. The apparatus of claim 21, wherein the apparatus reorders the second plurality of columns of the second search space relative to the first plurality of columns of the first search space based on the mapping.

23. The apparatus of claim 20, further comprising means for performing the second iteration to compare the second video block to the candidate video blocks in the second search space, wherein the means for performing the second iteration includes means for performing in parallel a second plurality of difference computations between pixel values of the second video block to be encoded and pixel values of one of the candidate video blocks in the second search space, wherein the second video block comprises a second macroblock that includes a second plurality of microblocks, wherein the second plurality of difference computations performed in parallel during the second iteration correspond to a row of one of the microblocks of the second macroblock.

24. The apparatus of claim 23, further comprising:
means for reloading another subset of the columns to define a third search space, the third search space defining a third plurality of columns of candidate video blocks to be compared to a third video block to be encoded during a third iteration of the motion estimation routine; and
means for performing the third iteration to compare the third video block to the candidate video blocks in the third search space.

25. The apparatus of claim 24, further comprising:
means for reloading another subset of the columns to define a fourth search space, the fourth search space defining a fourth plurality of columns of candidate video blocks to be compared to a fourth video block to be encoded during a fourth iteration of the motion estimation routine; and
means for performing the fourth iteration to compare the fourth video block to the candidate video blocks in the fourth search space.

26. A computer-readable medium comprising instructions that upon execution cause a processor to:
load a set of pixel values into memory to define a first search space, the first search space defining a first plurality of columns of candidate video blocks to be compared to a first video block to be encoded during a first iteration of a motion estimation routine;
perform the first iteration to compare the first video block to the candidate video blocks in the first search space, wherein performing the first iteration includes performing in parallel a plurality of difference computations between pixel values of the first video block to be encoded and pixel values of one of the candidate video blocks in the first search space, wherein the first video block comprises a macroblock that includes a plurality of microblocks, wherein the plurality of difference computations performed in parallel correspond to a row of one of the microblocks, wherein the microblocks include a plurality of rows, wherein performing the first iteration further includes generating a set of microblock difference values based on the computations, the microblock difference values respectively being indicative of differences between each of a plurality of microblocks that form the macroblock to be encoded and microblocks that form the candidate macroblock, and generating a macroblock difference value based on the computations, the macroblock difference value being indicative of a difference between the macroblock to be encoded and the candidate macroblock, wherein the macroblock difference value comprises a summation of the plurality of microblock difference values; and
reload a subset of the columns of candidate video blocks to define a second search space, the second search space defining a second plurality of columns of candidate video blocks to be compared to a second video block to be encoded during a second iteration of the motion estimation routine.

* * * * *